(12) United States Patent
Masui et al.

(10) Patent No.: US 7,612,951 B2
(45) Date of Patent: Nov. 3, 2009

(54) PROJECTION LENS UNIT

(75) Inventors: Atsuo Masui, Sakai (JP); Tokuji Matsuda, Kishiwada (JP); Kohei Wataru, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 276 days.

(21) Appl. No.: 11/728,120

(22) Filed: Mar. 23, 2007

(65) Prior Publication Data

US 2007/0236810 A1    Oct. 11, 2007

(30) Foreign Application Priority Data

Mar. 24, 2006 (JP) .............................. 2006-084078
Jun. 23, 2006 (JP) .............................. 2006-174051

(51) Int. Cl.
*G02B 7/02* (2006.01)
(52) U.S. Cl. .................. 359/811; 359/813; 359/814; 359/819
(58) Field of Classification Search ................. 359/811, 359/813, 814, 819, 821, 822, 823, 824, 826
See application file for complete search history.

(56) References Cited

U.S. PATENT DOCUMENTS

| | | | |
|---|---|---|---|
| 4,190,325 A * | 2/1980 | Moreno | 359/820 |
| 5,583,699 A * | 12/1996 | Nakayama | 359/687 |
| 6,179,426 B1 * | 1/2001 | Rodriguez et al. | 353/69 |
| 6,603,614 B2 | 8/2003 | Fulkerson et al. | 359/820 |
| 7,173,777 B1 * | 2/2007 | Lu et al. | 359/784 |
| 2005/0190665 A1 * | 9/2005 | Mori et al. | 369/44.17 |
| 2006/0007556 A1 | 1/2006 | Okajima et al. | 359/649 |

FOREIGN PATENT DOCUMENTS

| | | |
|---|---|---|
| JP | 6-130267 A | 5/1994 |
| JP | 7-209609 A | 8/1995 |
| JP | 2003-185904 A | 7/2003 |

* cited by examiner

*Primary Examiner*—Timothy J Thompson
(74) *Attorney, Agent, or Firm*—Sidley Austin LLP

(57) ABSTRACT

A projection lens system 1A enlarges and projects onto a screen 8, via a plurality of lenses G1 to G16, image light emitted from, a light source 4 and modulated by DMDs 3r to 3b. A movable lens barrel 25 holds the lens G16, having positive power, which is positioned closest to the DMDs 3r to 3b. An outer tube 24 holds the movable lens barrel 25 to enable movement in the optical axis direction. Through thermal deformation at the time of an increase in temperature, the bimetal member 27 moves the movable lens barrel 25 in the optical axis direction so as to recede from the image formation devices which are the DMDs 3r to 3b.

24 Claims, 25 Drawing Sheets

Fig. 8
(A)
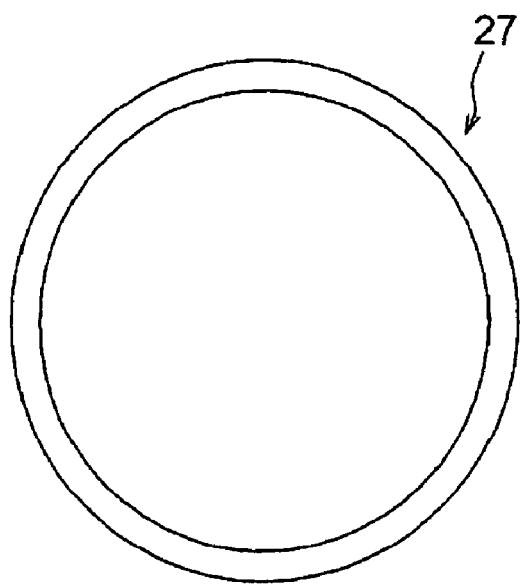
(B)
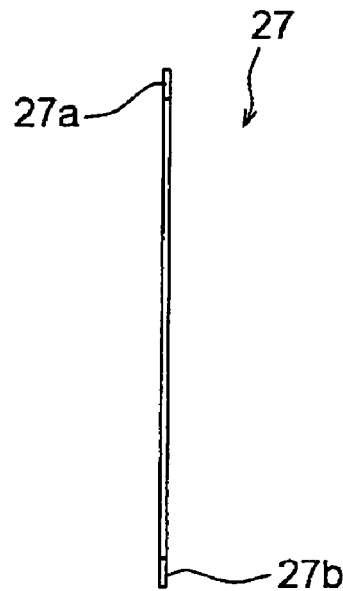
(C)
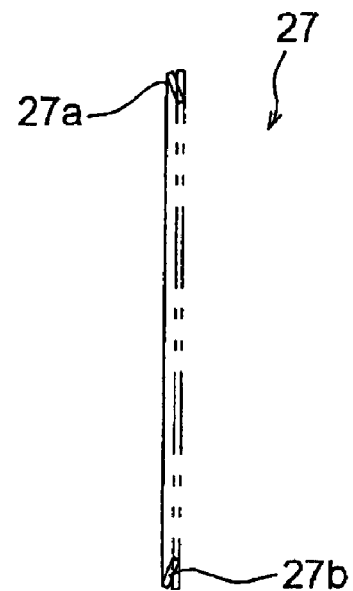

Fig. 13
(A)
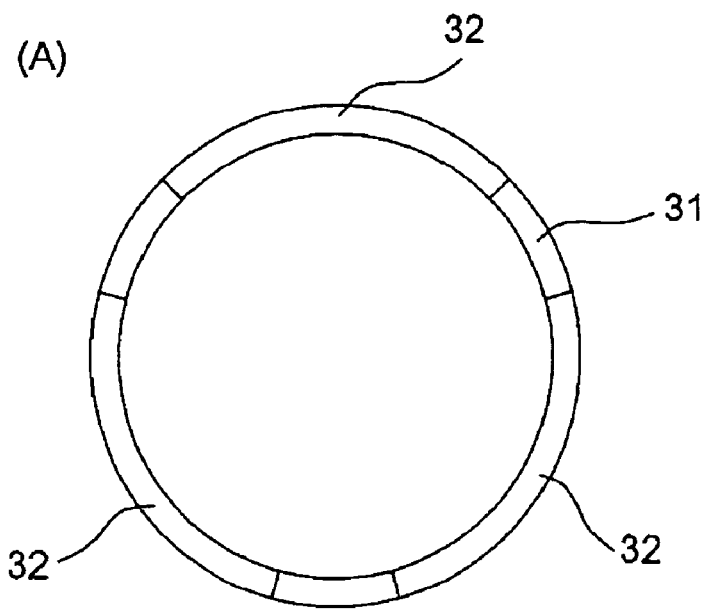
(B)
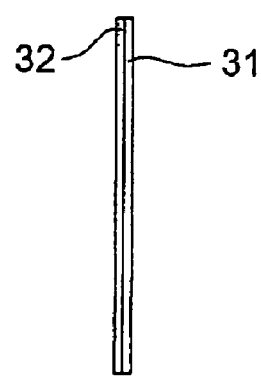
(C)
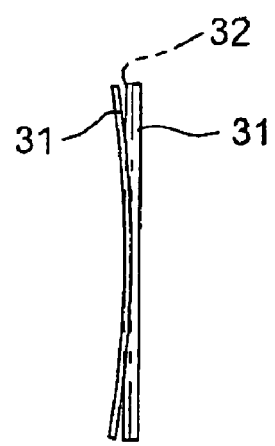

Fig. 25
(A)
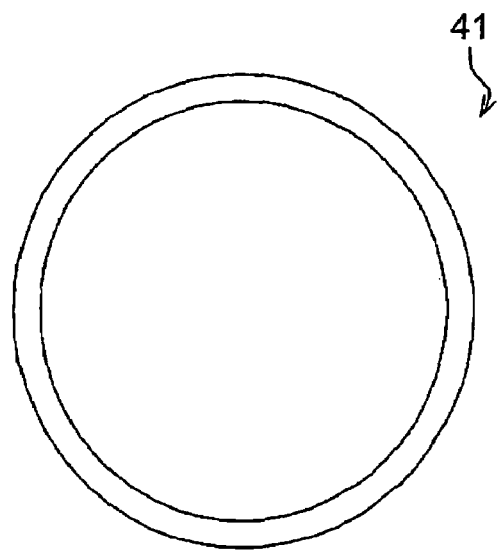
(B)
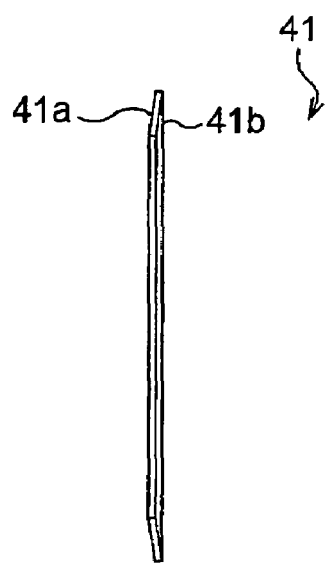
(C)
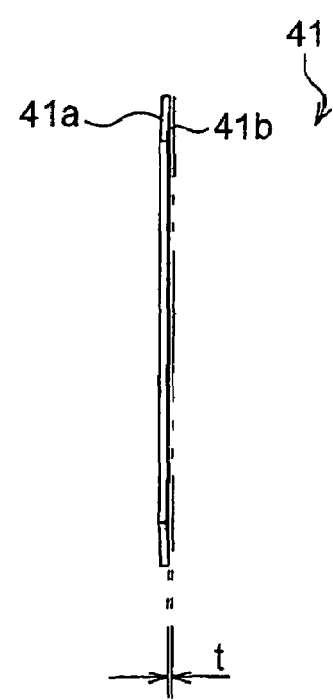

PROJECTION LENS UNIT

RELATED APPLICATION

This application is based on Japanese Patent Applications No. 2006-84078 and 2006-174051 the contents in which are incorporated herein by reference.

BACKGROUND OF THE INVENTION

The present invention relates to a projection lens unit, comprising a projection lens system which enlarges and projects image light from an image formation device onto a screen and a lens barrel which holds lenses of the projection lens system. In particular the present invention relates to correction of the focal point of the projection lens system when the temperature rises in the projection lens unit.

As projection-type image display devices, projectors comprising DMDs (Digital Micromirror Devices) and other reflection-type image formation devices, and which enlarge and project onto a screen an image appearing on the image formation device by means of a projection lens system comprising a plurality of lenses, are well-known. Because in large-size projectors for use in cinemas, which project images onto large-size screens, a high-output light source is used for illumination of the reflection-type image formation device, the increase in temperature of the projection lens system is significant. The increase in temperature is particularly significant for that portion of the projection lens system on the side closer to the image formation device. An increase in temperature causes a change in the refractive index of the materials comprised by lenses as well as thermal expansion of components comprising lenses, and it is known that, as a result, the focal point of the projection lens system may change, degrading the quality of the image projected onto the screen.

In Japanese Patent Laid-open No. 7-209609 (FIGS. 7 and 9), a configuration is disclosed for correcting for fluctuations in the focal point of a projection lens system arising from increases in temperature. Specifically, one lens is held so as to be movable with respect to the lens barrel in the optical axis direction, and by moving the lens according to increases in temperature, the focal paint is corrected. Two main aspects are disclosed in Japanese Patent Laid-open No. 7-209609 (FIGS. 7 and 9). In the first aspect, a flange is provided on the outer edge of the lens, and the lens is made to move in the optical axis direction through thermal expansion of this flange. In the second aspect, the lens is made to move in the optical axis direction by a thermal-expansion member which intervenes between the flange and the lens barrel.

However, the configuration disclosed in Japanese Patent Laid-open No. 7-209609 (FIGS. 7 and 9) has the following problems. First, the lens also expands in the radial direction with increases in temperature, and so if there is a difference in the thermal expansion coefficients of the lens and the lens barrel, the lens may dig into the lens barrel, so that the desired amount of movement is not obtained, and there is also the concern that the lens may be deformed. Further, if the gap between lens barrel and lens is set to be large in order to prevent such digging-in, then the lens inclination and eccentricity are increased. Also, complex irregular shape lens comprising a flange on the outer periphery are difficult and expensive to manufacture. In particular, it is difficult to provide a flange in the case of a glass lens. And, in the configuration of Japanese Patent Laid-open No. 7-209609 (FIGS. 7 and 9), only one lens can be moved among the plurality of lenses comprised by the projection lens system. Thus the configuration disclosed in Japanese Patent Laid-open No. 7-209609 (FIGS. 7 and 9) makes effective correction difficult, and entails a complex construction.

Because high image quality is required from the above-described projector for cinema use, such a projector has an anomalous dispersion lens with positive power having excellent characteristics for correction of chromatic aberration of magnification, positioned on the image formation device side of the diaphragm of the projection lens system. An anomalous dispersion lens having this positive power has large expansion and change in refractive index accompanying increases in temperature, and so is a major cause of fluctuations in the focal point of the projection lens system with rising temperature. However, Japanese Patent Laid-open No. 7-209609 (FIGS. 7 and 9) is related to the projection lens system of a projection-type image display device having an anomalous dispersion lens with positive power which is on the image formation device side of the diaphragm, and gives no instructions relating to a configuration to optimize corrections of the focal point accompanying increases in temperature.

An object of this invention is to effectively correct changes in the focal point of a projection lens system accompanying increases in temperature, by means of a comparatively simple configuration.

SUMMARY OF THE INVENTION

A first aspect of the invention provides a projection lens unit comprising: a projection lens system which enlarges and projects image light from an image formation device onto a screen; and a lens barrel which holds lenses of the projection lens system, and characterized in that the lens barrel comprises a movable lens bar, holding one or a plurality of lenses among the lenses of the projection lens system, positioned closest to the image formation device, and having positive power; a holding tube, which holds the movable lens barrel to enable movement in the optical axis direction; and a thermal deformation member which, by means of thermal deformation upon an increase in temperature, causes movement of the movable lens barrel in the optical axis direction so as to recede from the image formation device.

Temperature increases in the projection lens system act to increase the bark focal length. The back focal length is the distance, in the optical axis direction, from the lens closest to the image formation device among the plurality of lenses comprised by the projection lens system, to the focal point of the projection lens system. In other words, an increase in temperature of the projection lens system acts to shift the focal point of the projection lens system toward the rear-face side of the image formation device. On the other hand, a lens held by the movable lens barrel moves in the optical axis direction so as to recede from the image formation device as a result of thermal deformation of the thermal deformation member. Movement of a lens held by the lens barrel arising due to thermal deformation of the thermal deformation member acts so as to shift the focal point of the projection lens system toward the front-face side of the image formation device. Hence by moving the movable lens barrel holding the lens positioned closest to the image formation device by means of thermal deformation of the thermal deformation member, the shift in focal length of the projection lens system with an increase in temperature can be corrected.

The lens in the projection lens system which is closest to the image formation device and which tends to undergo temperature increases is moved by means of thermal deformation of the thermal deformation member. The thermal deformation member is placed in a position dose to the image formation device, so that the deformation amount at the time of temperature increase is large. Hence shifts in the focal length of the projection lens system at the time of temperature increase can be effectively corrected.

The lens barrel holding the lens is moved rather than the lens itself, and moreover thermal deformation of a thermal deformation member is utilized rather than thermal expansion of the lens itself so that digging into the lens barrel of the lens and lens deformation upon increases in temperature do not occur. Further, the lens can be maintained in a state of small inclination and eccentricity with respect to the lens barrel. Moreover, the lens itself need not be a irregular shape lens provided in a flange or similar, and construction is simple.

A second aspect of the invention provides a projection lens unit, comprising a projection lens system which enlarges and projects image light from an image formation device onto a screen, and a lens barrel which holds lenses of the projection lens system, and characterized in that the projection lens system is a telecentric optical system on the image formation device side; that the lens barrel moves one or a plurality of lenses among the lenses of the projection lens system, positioned closest to the image formation device, and having positive power, in the optical axis direction so as to cancel changes in the back focal length at the time of a change in temperature; and, that the focal length of the one lens or plurality of lenses which move at the time of a change in temperature has the following relation to the equivalent in air of the back focal length:

$$1 < f/LBair < 5$$

where f is the focal length, and LBair is the equivalent in air of the back focal length.

A projection lens unit of this invention comprises a movable lens barrel, which holds one or a plurality of lenses positioned closest to an image formation device and having positive power, and the movable lens barrel is caused to move in the optical axis direction relative to a holding tube by means of thermal deformation of a thermal deformation member at the time of an increase in temperature, so that the shift in focal length of the projection lens system accompanying the increase in temperature can effectively be corrected by means of a comparatively simple configuration.

BRIEF DESCRIPTION OF THE DRAWINGS

These and other objects and features of the invention will become apparent from the following description taken in conjunction with preferred embodiments of the invention with reference to the accompanying drawings, in which:

FIG. 8 shows a bimetal member in which FIG. 8A is a front view, FIG. 8B is a side view at normal temperature, and FIG. 8C is a side view when the temperature has risen;

FIG. 13 shows the bimetal member of the second alternative, in which FIG. 13A is a front view, FIG. 13B is a side view at normal temperature, and FIG. 13C is a side view at increased temperature;

FIG. 24 is a cross-sectional view showing the projection lens system of a projector in a fourth aspect of the invention; and, FIG. 25 shows the bimetal member in the fourth aspect, in which FIG. 25A is a front view, FIG. 25B is a side view at normal temperature, and FIG. 25C is a side view at increased temperature.

DETAILED DESCRIPTION OF THE PREFERRED EMBODIMENTS

First Embodiment

Figure 1:
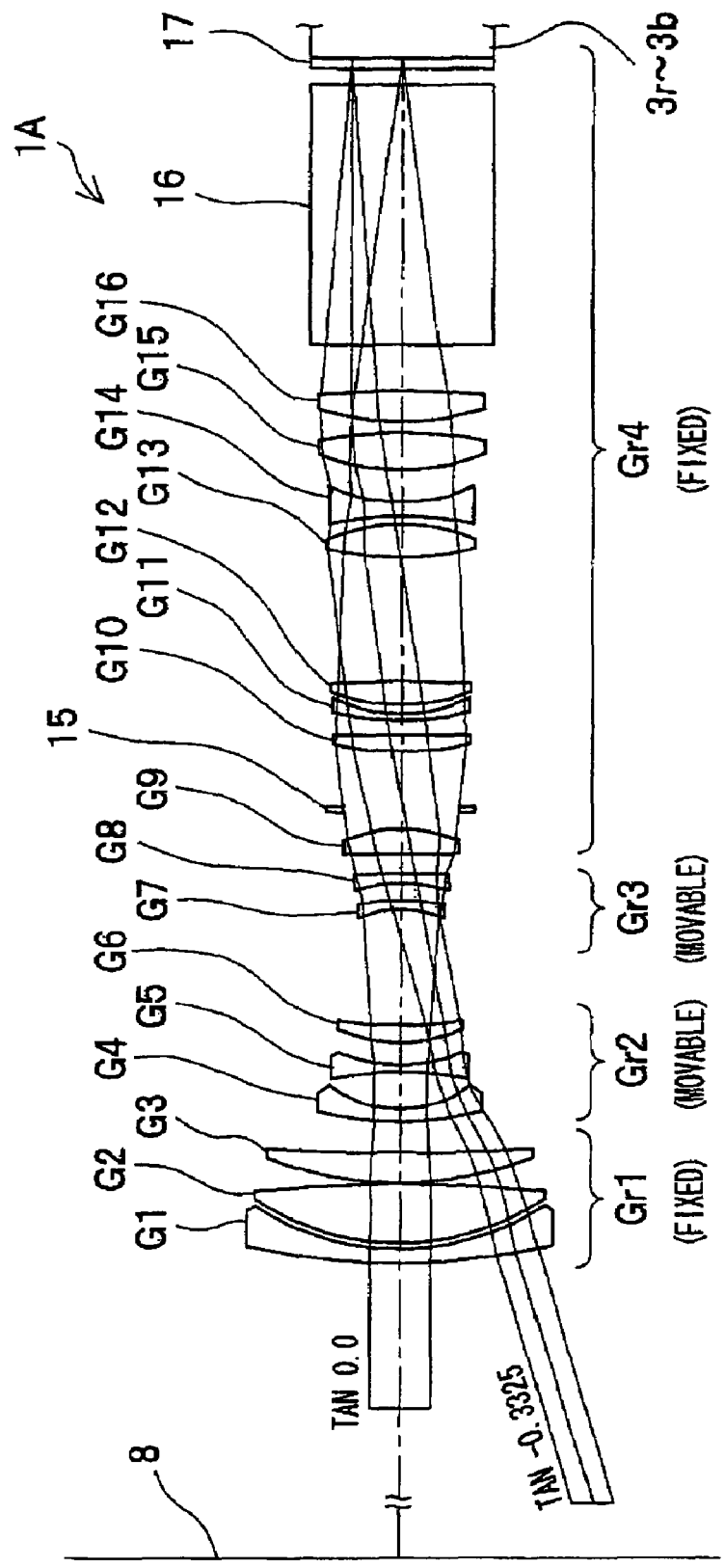
FIG. 1 is a schematic diagram showing the projection lens system of a projector in a first aspect of the invention.
Figure 4:
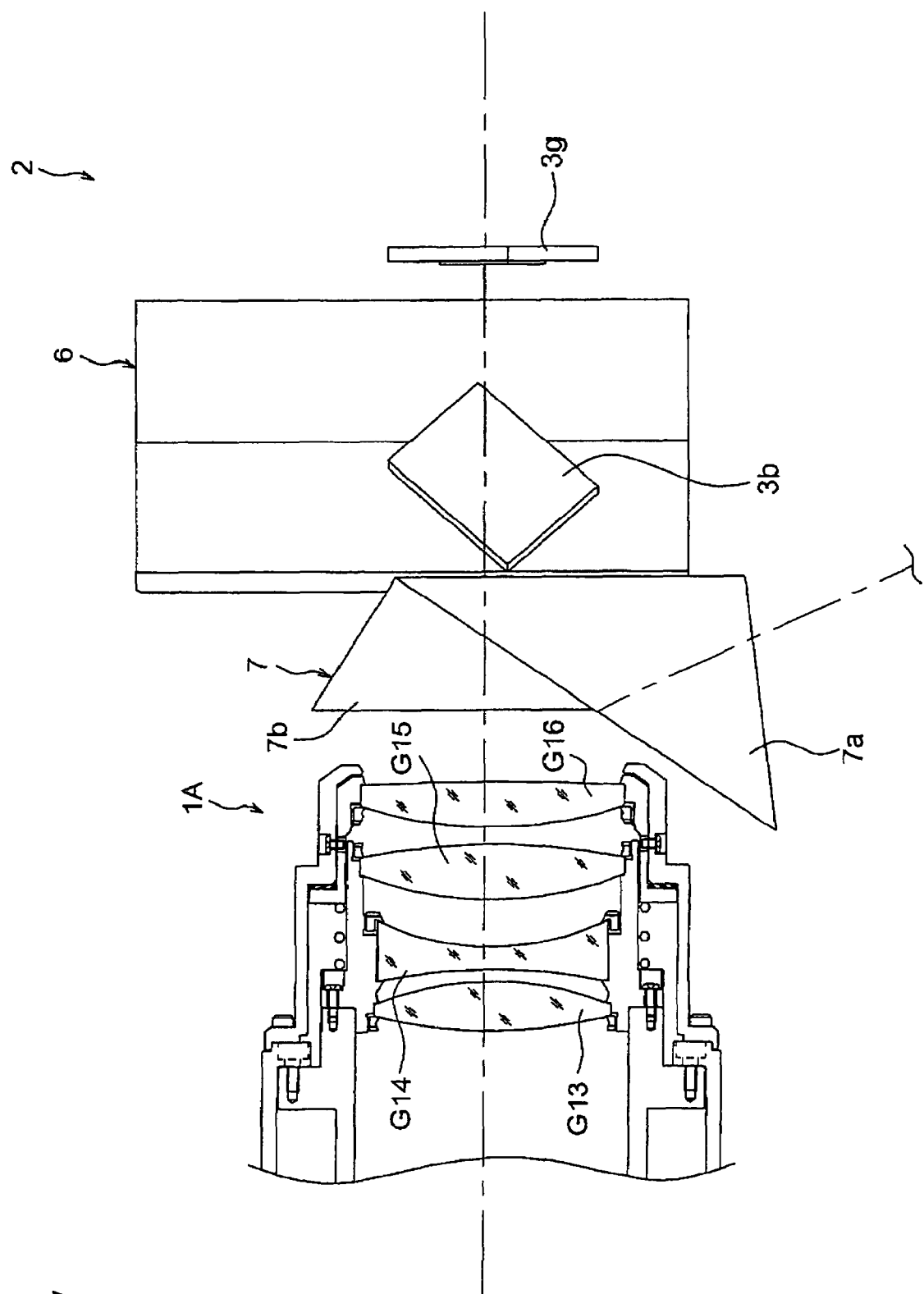
FIG. 4 is a schematic diagram showing the projection lens system, color-separation prism, total internal reflection prism, and DMD of a projector.
Figure 5:
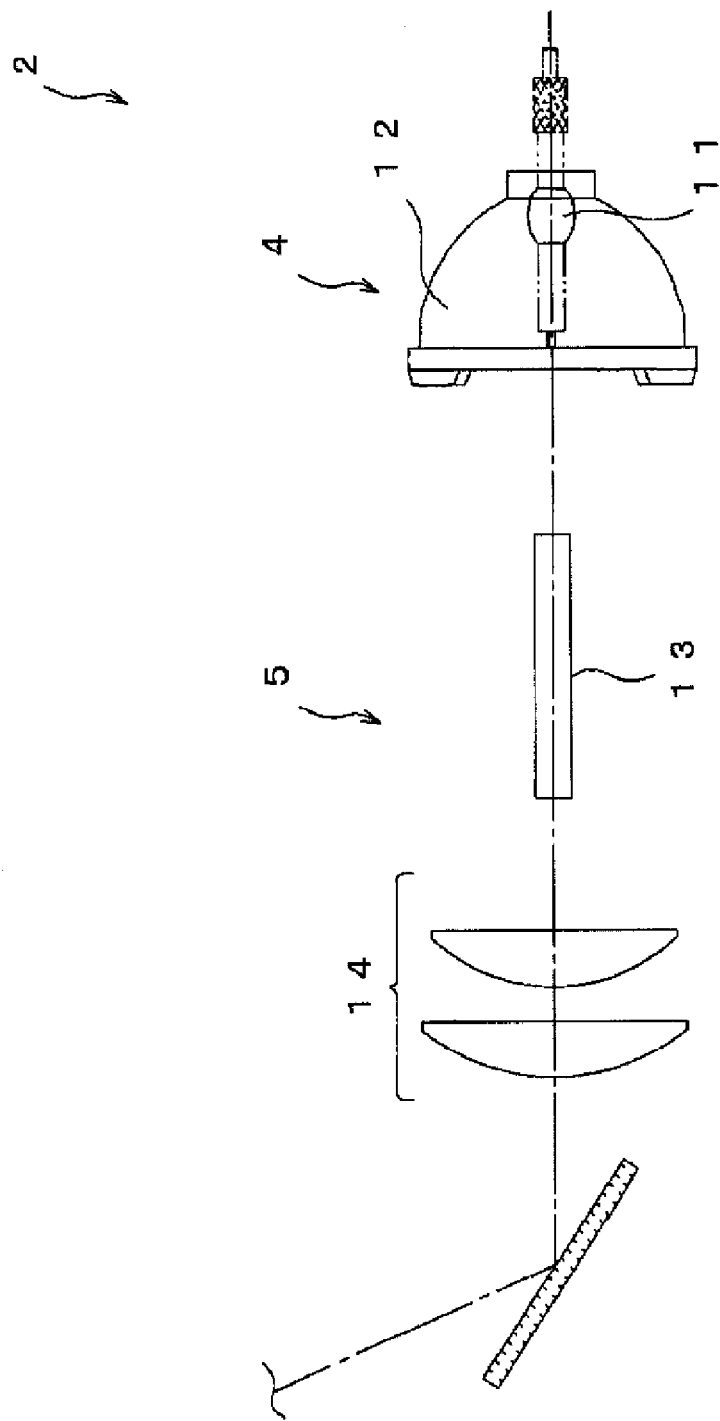
FIG. 5 is a schematic diagram showing the light source and illumination optical system of a projector.
Figure 6:
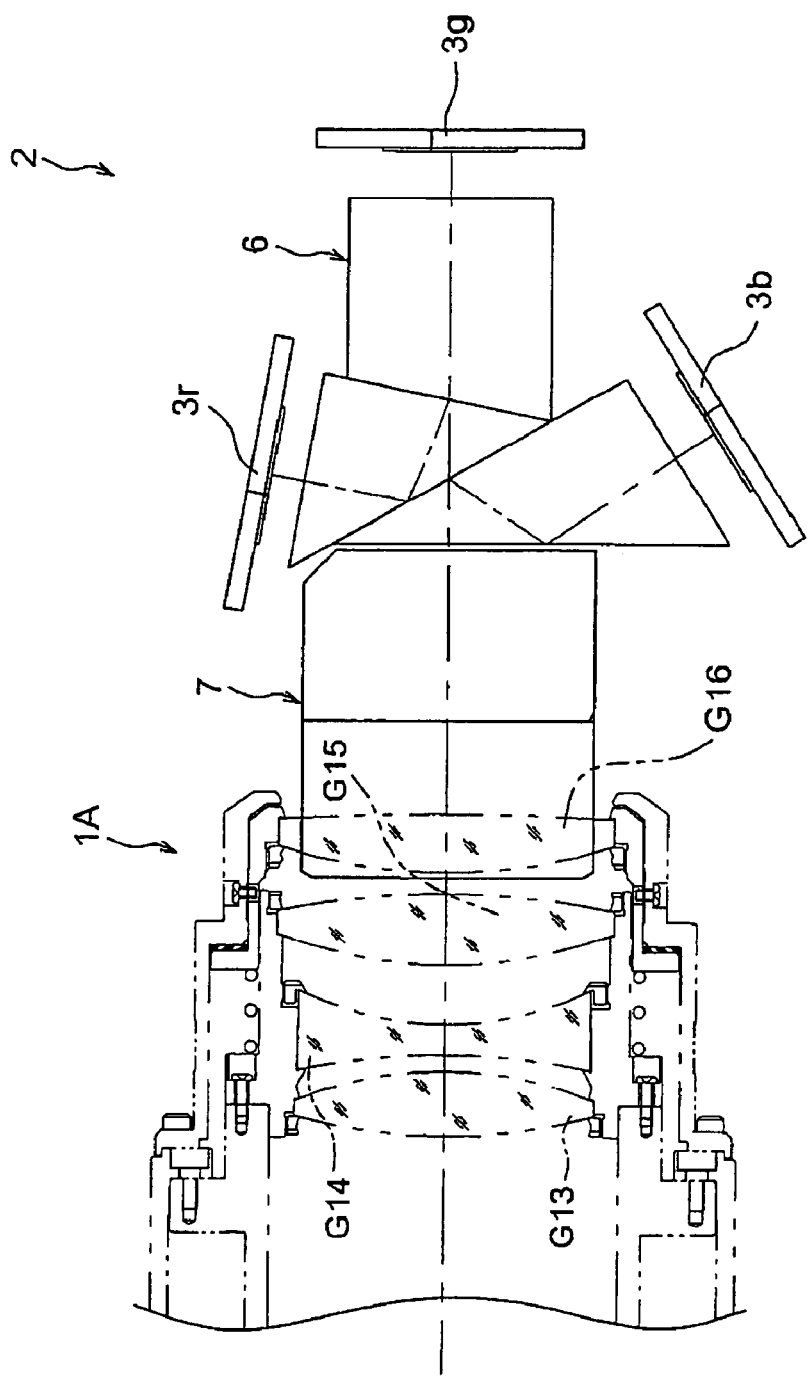
FIG. 6 is a schematic diagram showing the projection lens system, color-separation prism, total internal reflection prism, and DMD of a projector.

FIG. 1 shows the projection lens system 1A of a first aspect of the invention. This projection lens system 1A forms a portion of a front-projection type projector 2, shown in FIG. 4 through FIG. 6. A projection lens unit comprises the projection lens system 1A, and lens barrels, described below, which hold the lenses G1 to G16 of the projection lens system 1A (a fixed lens barrel 21, main lens barrel 22, and movable lens barrel 25). In addition to the projection lens system 1A, the projector 2 comprises, as a reflection-type image formation device, DMDs 3r, 3g, 3b, a light source 4, an illumination optical system 5, a color separation/combination prism 6, a total internal reflection prism 7, and a screen 8 (see FIG. 1).

In this aspect, the light source 4 comprises for example a light emission tube 11 which is a xenon lamp, and an elliptical reflector 12. The illumination optical system 5 comprises a rod integrator 13 and a relay lens group 14; light emitted from the light source 4 passes through the illumination optical system 5, total internal reflection prism 7, and color separation/combination prism 6 to irradiate the DMDs 3r to 3b. Image light modulated by the DMDs 3r to 3b passes through the color separation/combination prism 6, total internal reflection prism 7, and projection lens system 1A and is incident on the screen 8.

The total internal reflection prism 7 separates illumination light incident on the DMDs 3r to 3b and image light modulated by the DMDs 3r to 3b. The total internal reflection pram 7 comprises two prisms 7a and 7b; illumination light incident from the illumination optical system 5 undergoes total reflection at the air gap existing at the boundary faces between the two prisms 7a and 7b, and is guided to the DMDs 3r to 3b. The color separation/combination prism 6 splits the light from the total internal reflection prism 7 into light of three colors (red, green, and blue), and guides these beams to the DMDs 3r to 3b, and in addition combines image light modulated by the DMDs 3r to 3b. Image light combined by the color separation/combination prism 6 is transmitted through the air gap of the total internal reflection prism 7, and is enlarged and projected onto the screen 8 by the projection lens system 1A. In this way, beams in the projector 8 propagate from the DMDs 3r to 3b to the screen 8; however, in order to facilitate understanding in the following explanation, the explanation assumes that beams propagate from the screen 8 toward the DMDs 3r to 3b.

The overall configuration of the projection lens system 1A of the first aspect is here explained. As shown in FIG. 1, the projection lens system 1A comprises 16 lenses G1 to G16 and a diaphragm 15, and is telecentric. Between the lens G16 on the side of the DMDs 3r to 3b and the DMDs 3r to 3b are positioned a prism 16 which is the total internal reflection prism 7 and a color separation/combination prism 6, as well as cover 17. The radii of curvature of the lenses G1 to G16, the distances on the optical axis between the lens surfaces r1 to r37 of the lenses G1 to G16, the refractive indices N1 to N18, and the Abbe numbers ν1 to ν18, are as indicated in Table 1 and Table 2. In columns for distances between surfaces on the optical axis in Table 1 and Table 2, where a plurality of figures are present, the figures indicate, in order for intervals which change with zooming, the figures for the wide-angle end, the middle region (the midpoint distance between the wide-angle end and the telescopic end), and the telescopic end.

TABLE 1

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| LENS G1 | r1: 206.516 | — | | |
| | | d1: 5.000 | N1: 1.6720 | ν1: 32.17 |
| | r2: 89.927 | | | |
| | | d2: 1.988 | | |
| LENS G2 | r3: 88.934 | | | |
| | | d3: 19.417 | N2: 1.51680 | ν2: 64.20 |
| | r4: −748.055 | | | |
| | | d4: 0.600 | | |
| LENS G3 | r5: 128.484 | | | |
| | | d5: 9.934 | N3: 1.51680 | ν3: 64.20 |
| | r6: 583.546 | | | |
| | | d6: 9.931~25.285~43.295 | | |
| LENS G4 (ANOMALOUS DISPERSION LENS) | r7: 109.884 | | | |
| | | d7: 4.000 | N4: 1.49700 | ν4: 81.61 |
| | r8: 39.745 | | | |
| | | d8: 12.459 | | |
| LENS G5 (ANOMALOUS DISPERSION LENS) | r9: −120.635 | | | |
| | | d9: 2.500 | N5: 1.49700 | ν5: 81.61 |
| | r10: 50.990 | | | |
| | | d10: 7.436 | | |
| LENS G6 | r11: 54.127 | | | |
| | | d11: 5.652 | N6: 1.67270 | ν6: 32.17 |
| | r12: 118.936 | | | |
| | | d12: 38.537~19.534~5.943 | | |
| LENS G7 (ANOMALOUS DISPERSION LENS) | r13: −42.049 | | | |
| | | d13: 3.000 | N7: 1.49700 | ν7: 81.61 |
| | r14: −90.600 | | | |
| | | d14: 5.770 | | |
| LENS G8 | r15: −57.949 | | | |
| | | d15: 3.000 | N8: 1.67003 | ν8: 47.20 |
| | r16: 1373.702 | | | |
| | | d16: 6.891 | | |
| LENS G9 | r17: −686.398 | | | |
| | | d17: 8.125 | N9: 1.69680 | ν9: 55.46 |
| | r18: −54.236 | | | |
| | | d18: 5.869~9.519~5.099 | | |
| DIAPHRAGM | r19: ∞ | — | — | — |

TABLE 2

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| DIAPHRAGM | r19: ∞ | — | — | — |
|  |  | d19: 20.000 |  |  |
| LENS G10 | r20: 105.309 |  |  |  |
|  |  | d20: 5.213 | N10: 1.67003 | ν10: 47.20 |
|  | r21: 1469.27 |  |  |  |
|  |  | d21: 5.000 |  |  |
| LENS G11 | r22: 95.02 |  |  |  |
|  |  | d22: 2.000 | N11: 1.71300 | ν11: 53.94 |
|  | r23: 47.282 |  |  |  |
|  |  | d23: 3.259 |  |  |
| LENS G12 (ANOMALOUS DISPERSION LENS) | r24: 62.656 |  |  |  |
|  |  | d24: 7.618 | N12: 1.49700 | ν12: 81.61 |
|  | r25: −762.282 |  |  |  |
|  |  | d25: 40.648 |  |  |
| LENS G13 (ANOMALOUS DISPERSION LENS) | r26: 101.752 |  |  |  |
|  |  | d26: 10.671 | N13: 1.49700 | ν13: 81.61 |
|  | r27: −68.34 |  |  |  |
|  |  | d27: 2.579 |  |  |
| LENS G14 | r28: −128.128 |  |  |  |
|  |  | d28: 5.000 | N14: 1.80610 | ν14: 40.72 |
|  | r29: 58.492 |  |  |  |
|  |  | d29: 10.000 |  |  |
| LENS G15 (ANOMALOUS DISPERSION LENS) | r30: 82.682 |  |  |  |
|  |  | d30: 11.708 | N15: 1.49700 | ν15: 81.61 |
|  | r31: −151.641 |  |  |  |
|  |  | d31: 3.725 |  |  |
| LENS G16 (ANOMALOUS DISPERSION LENS. TEMPERATURE CORRECTION) | r32: 96.325 |  |  |  |
|  |  | d32: 9.702 | N16: 1.49700 | ν16: 81.61 |
|  | r33: −525.945 |  |  |  |
|  |  | d33: 15.300 |  |  |
| COLOR-SEPARATION PRISM | r34: ∞ |  |  |  |
|  |  | d34: 85.000 | N17: 1.51680 | ν17: 64.20 |
|  | r35: ∞ |  |  |  |
|  |  | d35: 5.000 |  |  |
| COVER GLASS | r36: ∞ |  |  |  |
|  |  | d36: 3.000 | N18: 1.50847 | ν18: 61.19 |
|  | r37: ∞ |  |  |  |
|  |  | — |  |  |

The projection lens system 1A comprises, in order from the side of the screen 8 (the enlarged side), an optical element group Gr1 having positive power; an optical element group Gr2 having negative power; an opt element group Gr3 having negative power; and an optical element group Gr4 having positive power Nine lenses G1 to G9 are positioned on the side of the screen 8 of the diaphragm 15. Of the lenses G1 to G9, the lenses G2, G3, G6, and G9 have positive power, and the lenses G1, G4, G5, G7, and G8 have negative power. In park, negative-power lenses G4, G5 and G7 are lenses with large anomalous dispersion and Abbe numbers above 70. On the side of the DMDs 3r to 3b educed side) from the diaphragm 15 are positioned the seven lenses G10 to G16. Of these lenses, G10, G12, G13, G15, and G16 have positive power, and lenses G11 and G14 have negative power. In particular lenses G12, G13, G15, and G16 are lenses with large anomalous dispersion, having Abbe numbers above 70.

The optical element group Gr1, comprising the three lenses G1 to G3 closest to the screen 8, are fixed in place even during changes in magnification zooming. The optical element group Gr2, comprising the three lenses G4 to G6 on the rear side of optical element group Gr1, are movable in the optical axis direction in order to change the magnification. The optical element group Gr3 comprising the two lenses G7, G8, on the rear side of optical element group Gr2, is movable, and moves in the optical axis direction in order to correct for changes in the back focal length when optical element group Gr2 is moved. The optical element group Gr4, comprising the lenses G9 to G16, diaphragm 15, prism 16, and cover glass 17, is fixed even during changes in magnification.

As shown in Table 3, below, the back focal length B of the projection lens system 1A of this aspect is 108.8 mm, and the air equivalent back focal length LBair is 78.8 mm. The back focal length is the distance in the optical axis direction from the lens (in this aspect, lens G16) closest to the image formation device (in this aspect, the DMDs) among the plurality of lenses comprised by the projection lens system, to the focal point of the projection lens system.

TABLE 3

|  | BACK FOCAL LENGTH LB (mm) | AIR EQUIVALENT BACK FOCAL LENGTH LBair (mm) | LBair/DIAGONAL LENGTH OF DMDS | LENS OR LENS GROUP MOVED TO CORRECT FOCAL POINT POSITION |
|---|---|---|---|---|
| FIRST EMBODIMENT | 108.8 | 78.8 | 3.2 | G16 |

TABLE 3-continued

| | | | | |
|---|---|---|---|---|
| SECOND EMBODIMENT | 63.5 | 49.5 | 2.0 | G15, G16 |
| THIRD EMBODIMENT | 63.5 | 49.5 | 2.0 | G17 |

| | | | CHANGE IN ABERRATION AT TIME OF CORRECTION | |
|---|---|---|---|---|
| FOCAL LENGTH f OF LENS OR LENS GROUP MOVED TO CORRECT FOCAL POINT POSITION (mm) | f/LBair | AMOUNT OF MOVEMENT OF LENS OR LENS GROUP NECESSARY TO CORRECT FOCAL POINT POSITION BY 0.1 mm | SPHERICAL ABERRATION | CURVATURE OF FIELD IN MERIDIONAL PLANE |
| FIRST EMBODIMENT 164.7 | 2.09 | −0.13 | 0.0024 | −0.0057 |
| SECOND EMBODIMENT 77.2 | 1.56 | −0.11 | 0.0015 | −0.0114 |
| THIRD EMBODIMENT 155.7 | 3.15 | −0.18 | 0.0021 | −0.0027 |

Figure 2:
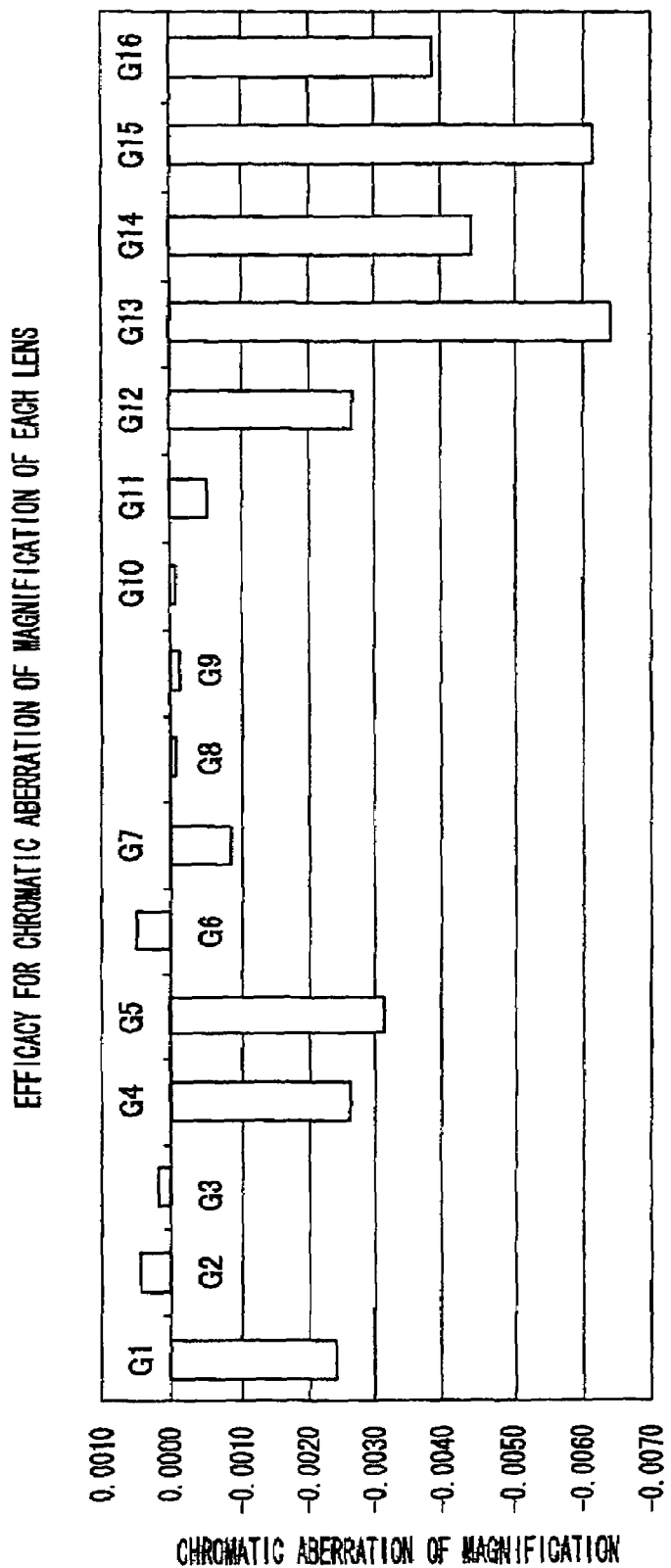
FIG. 2 is a graph showing the degree of efficacy with resect to chromatic aberration of magnification of individual lenses comprised by the projection lens system of the first aspect.

As described above, the projection lens system 1A of this aspect comprises lenses G12, G13, G15, G16, positioned on the side of the DMDs 3r to 3b from the diaphragm 15, having-positive power, and having large anomalous dispersion with Abbe numbers above 70. If the Abbe numbers of these positive-power lenses G12, G13, G15, G16 are 70 or lower, anomalous dispersion is insufficient, and correction for chromatic aberration of magnification is inadequate. The positive-power lenses G12, G13, G15, G16 are positioned on the side of the DMDs 3r to 3b from the diaphragm 15 because on the side of the DMDs 3r to 3b from the diaphragm 15, the positions of on-axis light on the optical axis and off-axis light not on the optical ads in order to secure telecentric properties are more distant than on the screen 8 side of the diaphragm 15, and so this position is more appropriate for correcting off-axis aberration. In other words, by positioning positive-power lenses having anomalous dispersion on the side of the DMDs 3r to 3b from the diaphragm 15, chromatic aberration of magnification can be effectively corrected FIG. 2 shows the efficacy for correcting chromatic aberration of magnification of each of the lenses G1 to G16 in the projection lens system 1A of this aspect. From FIG. 2 it is seen that the positive-power lenses G12, G13, G15, G16, positioned rearward from the diaphragm 15, make particularly large contributions to correction of chromatic aberration of magnification.

Figure 3:
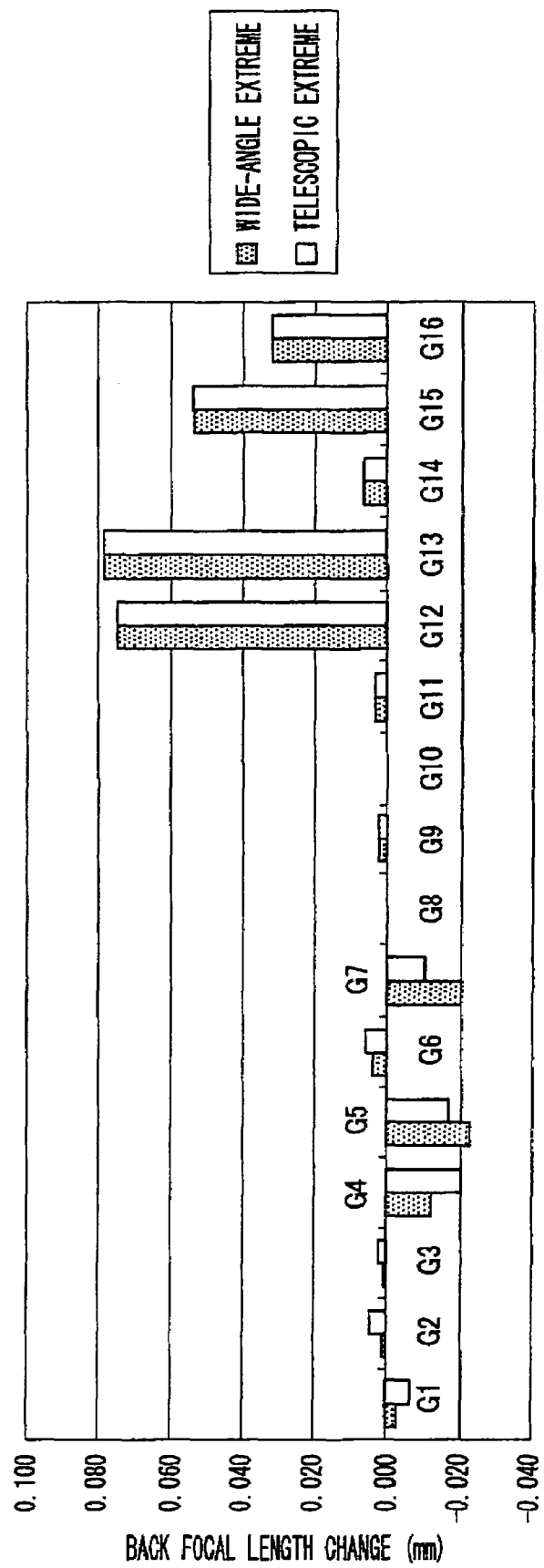
FIG. 3 is a graph showing the degree of efficacy with respect to temperature characteristics of individual lenses comprised by the projection lens system of the first aspect.

However, a lens with anomalous dispersion generally exhibits more expansion and change in refractive index with temperature increases than does a lens with a small Abbe number, and so becomes a major cause of changes in the focal length of a projection lens system due to temperature increases. FIG. 3 shows the efficacy with respect to the back focal length LB of each of the lenses G1 to G16 when the temperature rises by 30° C. From FIG. 3 also it is seen that the lenses G4, G5, G7, G12, G13, G15, G16, having anomalous dispersion, significantly affect changes in focal length with increasing temperature. In general, increases in temperature in a projection lens system act to increase the back focal length. In other words, increases in temperature in a projection lens system act to shift the focal point of the projection lens system to the rear side of the image formation device (in this aspect, DMDs).

In this way, chromatic aberration of magnification can be effectively corrected by means of a configuration in which anomalous dispersion lenses having positive power are positioned to the rear of the diaphragm 15; but a shift in the focal point position at the time of a temperature increase (a lengthening of the back focal length) is unavoidable. In this aspect, through a configuration, described in detail below referring to FIG. 7 to FIG. 10, by moving the lens G16 which is positioned closest to the DMDs 3r to 3b among the lenses G1 to G16 comprised by the projection lens system 1A in the direction receding from the DMs 3r to 3b (the direction which shifts the focal point of the projection lens system 1A to the surface side of the DMDs 3r to 3b) when there is a temperature increase, the shift in focal point position of the projection lens system 1A at the time of a temperature increase is corrected.

The reason for selecting the lens G16 positioned closest to the DMDs 3r to 3b as the lens to be moved at the time of a temperature increase is explained. As is clear from FIG. 1, the lens G16 positioned closest to the DMDs 3r to 3b among the lenses comprised by the projection lens system 1A has positive power, and mainly has the function of condensing substantially parallel on-axis and off-axis light on the DMDs 3r to 3b in order to secure a sufficiently long back focal length and telecentric properties. Hence by displacing this lens G16, a shift in the focal point position can be corrected with hardly any change in other aberrations.

Table 4 shows design values for the back focal length and various types of aberration at the telescopic end of the projection lens system 1A and the amounts of change in the focal point position and aberration when lenses G14 to G16 are displaced to the screen 8 side by 0.1 nm. When lens G15 is displaced, the sensitivity of the amount of change in the focal point position is low, and aberration changes are large. When lens G14 is displaced, the sensitivity of the amount of change in focal point position is high, but changes in aberration are large. On the other hand, when lens G16 is displaced, the sensitivity of the amount of change in focal point position is high, and aberration changes are comparatively small. From Table 4 also, it is preferable that the lens G16 positioned closest to the DMDs 3r to 3b be displaced to correct for changes in the focal point position upon temperature increases.

TABLE 4

| LENS DISPLACED | CHANGE IN FOCAL POINT POSITION | CHANGE IN SPHERICAL ABERRATION | CHANGE IN DISTORTION ABERRATION |
|---|---|---|---|
| G16 | −0.0762 | −0.0253 | −0.001159 |
| G15 | −0.0131 | 0.0662 | 0.005739 |
| G14 | 0.1836 | −0.0366 | 0.0448 |

TABLE 4-continued

| LENS DISPLACED | CURVATURE OF FIELD IN SAGITTAL PLANE | CURVATURE OF FIELD IN MERIDIONAL PLANE |
|---|---|---|
| G16 | −0.000278 | −0.000927 |
| G15 | 0.009052 | 0.031024 |
| G14 | −0.00175 | −0.008705 |

*DESIGN VALUE
BACK FOCAL LENGTH: 108.8 mm
SPHERICAL ABERRATION: −0.0258 mm
DISTORTION ABERRATION: 0.
CURVATURE OF FIELD IN SAGITTAL PLANE: −0.084.
CURVATURE OF FIELD IN MERIDIONAL PLANE: −0.1304

As shown in the above Table 3, in the projection lens system 1A of this aspect the air equivalent back focal length LBair is 78.8 mm, whereas the focal length f of lens G16 is 164.7-mm, and the ratio of the latter to the former (LBair) is set to 2.09, satisfying the following equation (1).

$$1 < f/LBair < 5 \quad (1)$$

where f is the focal length, and LBair is the equivalent in air of the back focal length.

If the power of the lens displaced when there is an increase in temperature (in this aspect, lens G16) is extremely small, then the amount of lens movement necessary to correct a shift in focal point upon an increase in temperature must be set to a large value, and so the mechanism of the projection lens unit comprising a bimetal member 27 or other thermal deformation member, described below, becomes large. Hence it is preferable that the ratio (f/LBair) of the focal length f of the lens moved at the time of temperature increase to the air equivalent back focal length LBair be set to less than 5. On the other hand, if the power of the lens displaced at the time of temperature increase is too great, then it is difficult to secure telecentric properties for the optical path from the projection lens system to the image formation device (n this aspect, the DMDs 3r to 3b), and changes in aberration upon displacement of the lens to correct for the focal point position become large. Hence it is preferable that the above ratio (LBair) be set to a value greater than 1 (unity). When the lens of the projection lens system 1A closest to the DMDs 3r to 3b functions mainly to condense the substantially parallel on-axis light and off-axis light on the DMDs 3r to 3b, the shift in focal point position can be corrected with almost no change in aberration, regardless of the type of the projection lens system 1A (power arrangement, group configuration, lens surface shapes, and similar).

As shown in Table 3 above, in the projection lens system 1A of this aspect the ratio of the diagonal length of the DMDs 3r to 3b to the air equivalent back focal length LBair is set to 3.2 as to satisfy the following equation (2).

$$Lair/DMD \text{ diagonal length} \geq 2 \quad (2)$$

A color-separation/combination prism 6 and a total internal reflection prism 7 are positioned between the lens G16 which is furthest rearward in the projection lens system 1A, and the DMDs 3r to 3b. As indicated in equation (2), by configuring the projection lens system 1A so as to have a sufficiently long back focal length two or more times greater than the diagonal lengths of the DMDs 3r to 3b, necessary and sufficient space can be secured to position the color separation/combination prism 6 and total internal reflection prism 7, to capture illumination light from the illumination optical system 5 at the DMDs 3r to 3b. As described above, the projection lens system 1A has telecentric properties, and so by capturing illumination light from the illumination optical system 5, the occurrence of reduction of contrast and color unevenness in the image light modulated by the DMDs 3r to 3b can be prevented.

Next, a mechanism to displace the lens G16 toward the screen 8 at the time of an increase in temperature is explained in detail, referring to FIG. 7 through FIG. 10.

Figure 7:
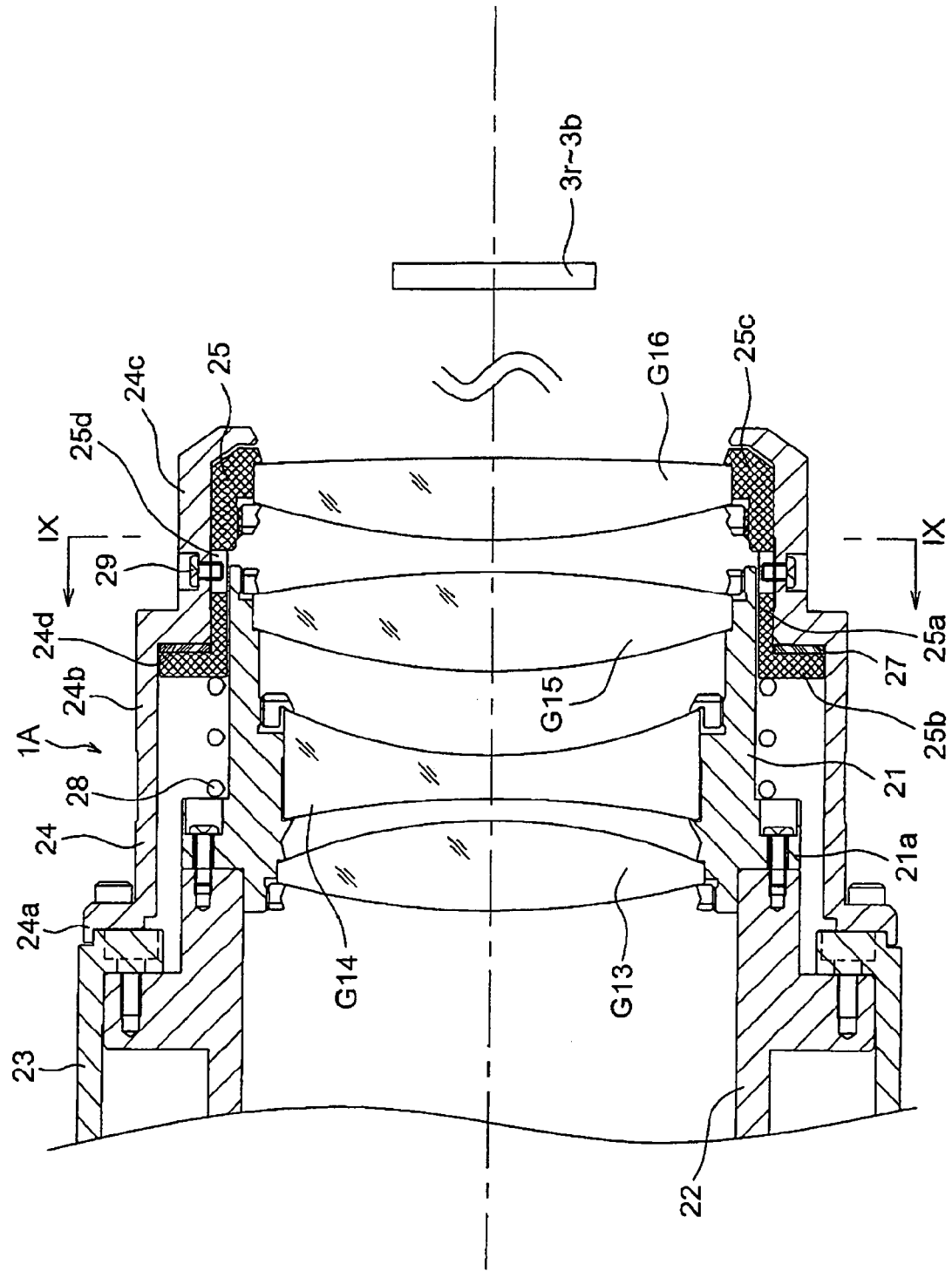
FIG. 7 is a cross-sectional view showing the projection lens system (at normal temperature) of the first aspect.

FIG. 7 shows the vicinity of the four lenses G13 to G16 on the side of the DMDs 3r to 3b, among the lenses G1 to G16 of the projection lens system 1A. A fixed lens barrel 21, holding the lenses G13 to G15 which are lenses positioned on the enlarged side from the lens held by the movable lens barrel 25, comprises a flange portion 21a on the forward-edge side, and this flange portion 21a is screwed and fixed into place in the main lens barrel 22. Though not shown in FIG. 7, the lenses G1 to G12 and diaphragm 15 are mounted on the main lens barrel 22. The periphery of the main lens barrel 22 is covered by a cover 23.

A flange portion 24a provided on the front-edge side of the outer tube (holding tube) 24 is screwed and fixed in place in the main lens barrel 22. The fixed lens barrel 21 is accommodated within the outer tube 24. As explained above, the fixed lens barrel 21 is fixed to the main lens barrel 22, and so the fixed lens barrel 21 is fixed relative to the holding tube via the main lens barrel 22. The outer tube 24 comprises a large-diameter portion 24b, having a first inner diameter; a small-diameter portion 24c, having a second inner diameter smaller than that of the first inner diameter; and, a reference surface 24d, which is a ring-shape surface, perpendicular to the optical axis, intervening between the inner surface of the large-diameter portion 24b and the inner surface of the small-diameter portion 24c.

The movable lens barrel 25, which holds the anomalous dispersion lens G16 having positive power and positioned closest to the DMDs 3r to 3b, is fitted into the outer tube 24. This movable lens barrel 25 comprises a body 25a which is of tube shape with both ends open, a flange portion 25b formed on the front-end side of the body 25a, and a lens holding portion 25c extending inward in the radial direction on the rear-end side of the body 25a. The flange portion 25b is positioned in the cylindrical space delineated by the inner peripheral surface of the large-diameter portion 24b of the outer tube 24 and the outer peripheral surface of the fixed lens barrel 21. The body 25a of the movable lens barrel 25 passes between the inner peripheral surface of the small-diameter portion 24c of the outer tube 24 and the outer peripheral surface of the fixed lens barrel 21, extending toward the rear-end side of the outer tube 24. The outer peripheral surface of the body 25a of the movable lens barrel 25 is in sliding contact with the inner peripheral surface of the small-diameter portion 24c of the outer tube 24, and so the movable lens barrel 25 is held so as to enable movement in the optical axis direction relative to the outer tube 24. A gap exists between the inner peripheral surface of the body 25a of the movable lens barrel 25 and the outer peripheral surface of the fixed lens barrel 21, and the two surfaces are not in contact.

It is preferable that the length in the optical axis direction of the contact portion of the movable lens barrel 25 and outer tube (holding tube) 24 be 15 mm or greater at normal temperature. By providing sufficient length for the contact portion of the movable lens barrel 25 and the outer tube 24, inclination and eccentricity arising from fitting the movable lens barrel 25 into the outer tube 24 can be prevented.

A flat ring-shape bimetal member 27 such as that shown in FIGS. 8A and 8B is positioned between the reference surface 24d of the above-described outer tube 24 and the flange portion 25b of the movable lens barrel 25. The bimetal member 27 is placed in an orientation with the low-expansion side 27a on the front side (the side of the screen 8), and with the high-expansion side 27b facing the rear side (the DMDs 3r to 3b). A coil spring 28 is positioned, in the compressed state, between the flange portion 25b of the movable lens barrel 25 and the flange portion 21a of the fixed lens barrel 21. This coil spring 28 elastically impels the movable lens barrel 25 holding the lens G16 toward the rear side (the side of the DMDs 3r to 3b in the optical axis direction), and has the function of elastically pressing the movable lens barrel 25 against the reference surface 24d, with the bimetal member 27 intervening. The movable lens barrel 25 may be impelled by elastic means other than a coil spring 28 as well.

Figure 9:
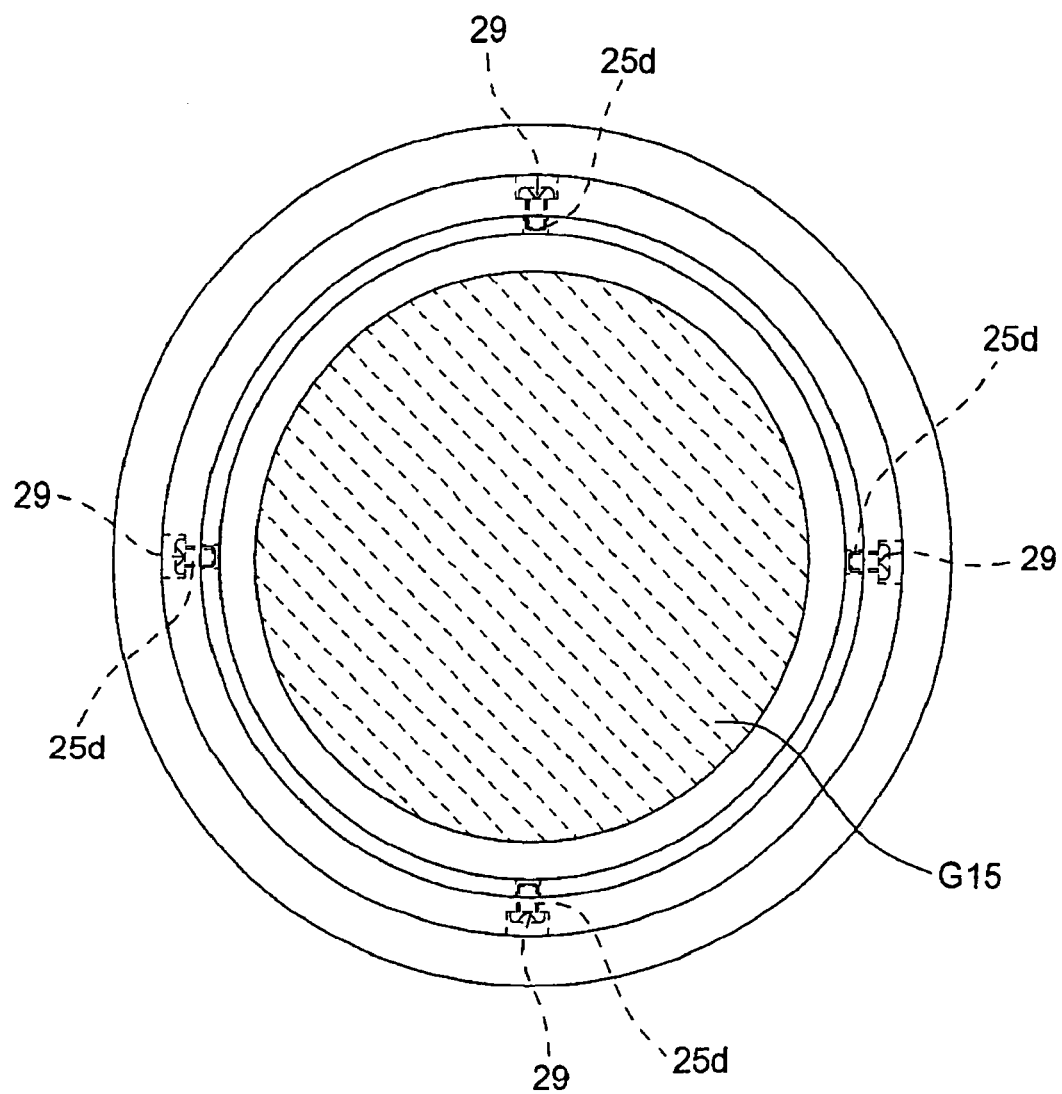
FIG. 9 is a cross-sectional view along line IX-IX in FIG. 7.

Referring to FIG. 7 and FIG. 9, four groove holes 25d are provided in the body 25a of the movable lens barrel 25, at equal-angle intervals (90° intervals) seen from the optical axis direction, extending in the optical axis direction. The tips of screws 29 which screw into the outer tube 24 are inserted into these groove holes 25d. The groove holes 25d and screws 29 form a rotation-halting mechanism in this invention. By having the screws 29 interfere with the side walls of the groove holes 25d, rotation about the optical axis of the movable lens barrel 26 relative to the outer tube 24 is impeded. Further, if the four screws 29 are loosed and the tips removed from the groove holes 25d, the movable lens barrel 25 can be rotated freely about the optical axis relative to the body 25a. Rotation positions of the movable lens barrel 25 about the optical axis relative to the outer tube 24 can be set to four locations, corresponding to the number of groove holes 25d. By adjusting the rotation position about the optical axis of the movable lens barrel 25, the eccentricity performance of the lens GIG held by the movable lens barrel 25 can be corrected. By increasing the number of groove holes 25d, the number of rotation positions which can be set for the movable lens barrel 25 can be increased.

Figure 10:
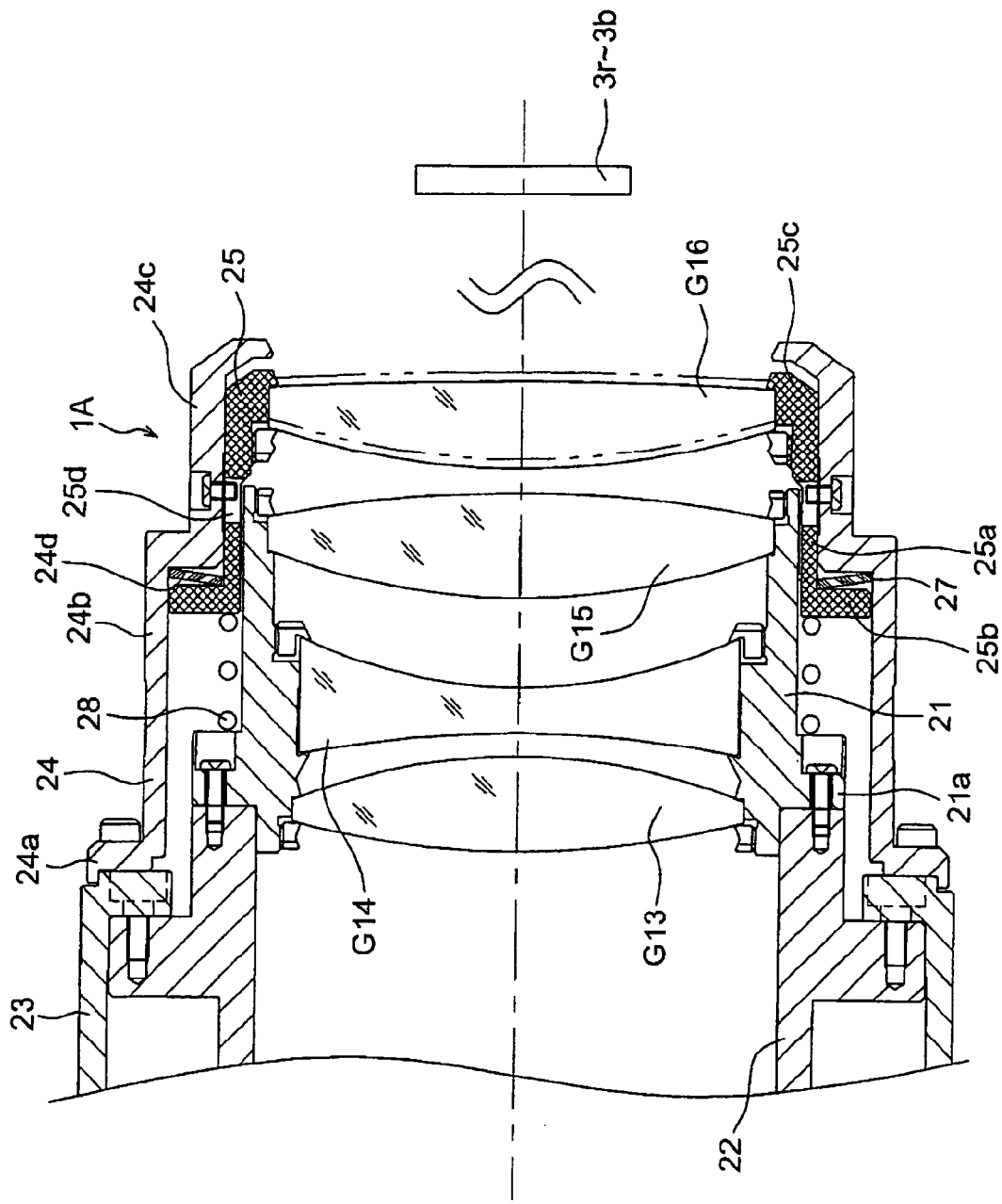
FIG. 10 is a cross-sectional view showing the projection lens system (at increased temperature) of the first aspect.

Due to increases in temperature of the projection lens system 1A caused by heat generated by the light source 4 (see FIG. 5) and other causes, the back focal length is lengthened, and the focal point of the projection lens system 1A is shifted to the rear-surface side of the DMDs 3r to 3b. On the other hand, at the time of a temperature increase, the ring-shape bimetal member 27 is deformed such that the thickness is increased, as shown in (C) of FIG. 8. As shown in FIG. 10, when the thickness of the bimetal member 27 increases, the flange portion 25b of the movable lens barrel 25 is pushed in the forward direction by the bimetal member 27. As a result, the movable lens barrel 25 moves in the direction receding from the DMDs 3r to 3b (toward the screen 8), in opposition to the elastic impelling force of the coil spring 28, and the lens G16 held by the movable lens barrel 25 also moves in this direction. The movement of this lens G16 acts to shift the focal point toward the surface side of the DMDs 3r to 3b. Hence by causing the movable lens barrel 25 (lens G16) to move through thermal deformation of the bimetal member 27, the shift in the focal point position of the projection lens system 1A upon an increase in temperature can be corrected. When the temperature declines and the bimetal member 27 returns to a flat shape, the elastic impelling force of the coil spring 28 causes the movable lens barrel 25 (lens G16) to return to the initial position, shown in FIG. 7.

The lens G16 which among the plurality of lenses G1 to G16 of the projection lens system 1A is in the position closest to the DMDs 3r to 3b, that is, closest to the light source 4, and which most readily undergoes an increase in temperature, is moved through thermal deformation of the bimetal member 27. Further, the bimetal member 27 is positioned close to the light source 4, and so the displacement amount at the time of temperature increases is large. Hence shifts in the focal point position of the projection lens system 1A upon increases in temperature can be effectively corrected.

The movable lens barrel 25 holding the lens G16 is moved, rather than the lens G16 itself, and so digging of the lens G16 into the outer tube 24 or another lens barrel upon an increase in temperature, and deformation of the lens G16, do not occur, and moreover the lens G16 can be maintained in a state with small inclination and eccentricity relative to the lens barrel. Further, the lens G16 need not itself be an irregular shape lens provided with a flange or similar, and construction is simple.

As explained above, during zooming the movable lens barrel 25 used to move the lens G16 during temperature increases is fixed in place (see FIG. 1), and so the lens G16 held by the movable lens barrel 25 is at the same position in all zoom regions. Hence changes with zoom position in the effectiveness of correction of the focal point position upon temperature increases can be reduced. Moreover, the construction of the projection lens system is simplified with respect to the fact that the lens movement mechanism for zooming (optical element groups Gr2 and Gr3) need not be linked to the outer tube 24 or movable lens barrel 25.

In this aspect, as explained above, a bimetal member 27 is used as a thermal deformation member. The bimetal member 27 has high heat resistance, and is suitable for use in an application in which the projection lens system is at high temperatures, such as in a large-screen high-brightness projector. Moreover, by adopting a bimetal member 27 the thermal capacity can generally be set to be small, so that the rate of response of deformation to temperature increases can be raised.

In this way, by means of this aspect the shift in focal point position of a projection lens system accompanying an increase in temperature can be effectively corrected through a comparatively simple configuration.

FIG. 11 through FIG. 16 show alternative configurations for moving the lens G16 closes to the DMDs 3r to 3b toward the screen 8 upon an increase in temperature.

Figure 11:
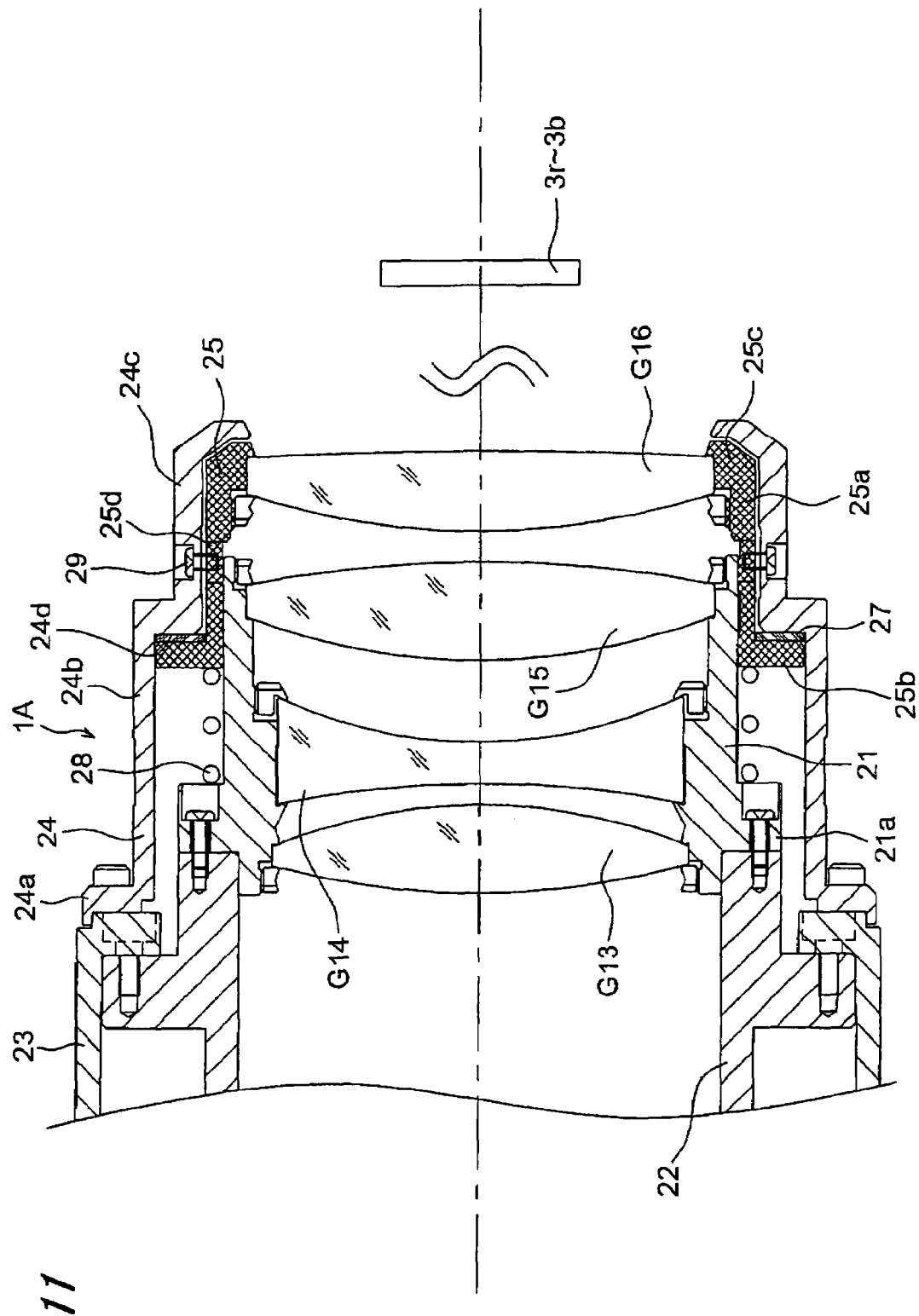
FIG. 11 is a cross-sectional view showing a first alternative for a projection lens system.

In the alternative shown in FIG. 11, the movable lens barrel 25 is fitted on the outside of the fixed lens barrel 21. Specifically, the inner peripheral surface of the body 25a of the movable lens barrel 25 makes contact with the outer peripheral surface of the fixed lens barrel 21 to enable sliding, and by this means the movable lens barrel 25 is held so as to enable movement in the optical axis direction relative to the fixed lens barrel 21. A gap exists between the outer peripheral surface of the body 25a of the movable lens barrel 25 and the inner peripheral surface of the outer tube 24, and the two surfaces are not in contact.

Figure 12:
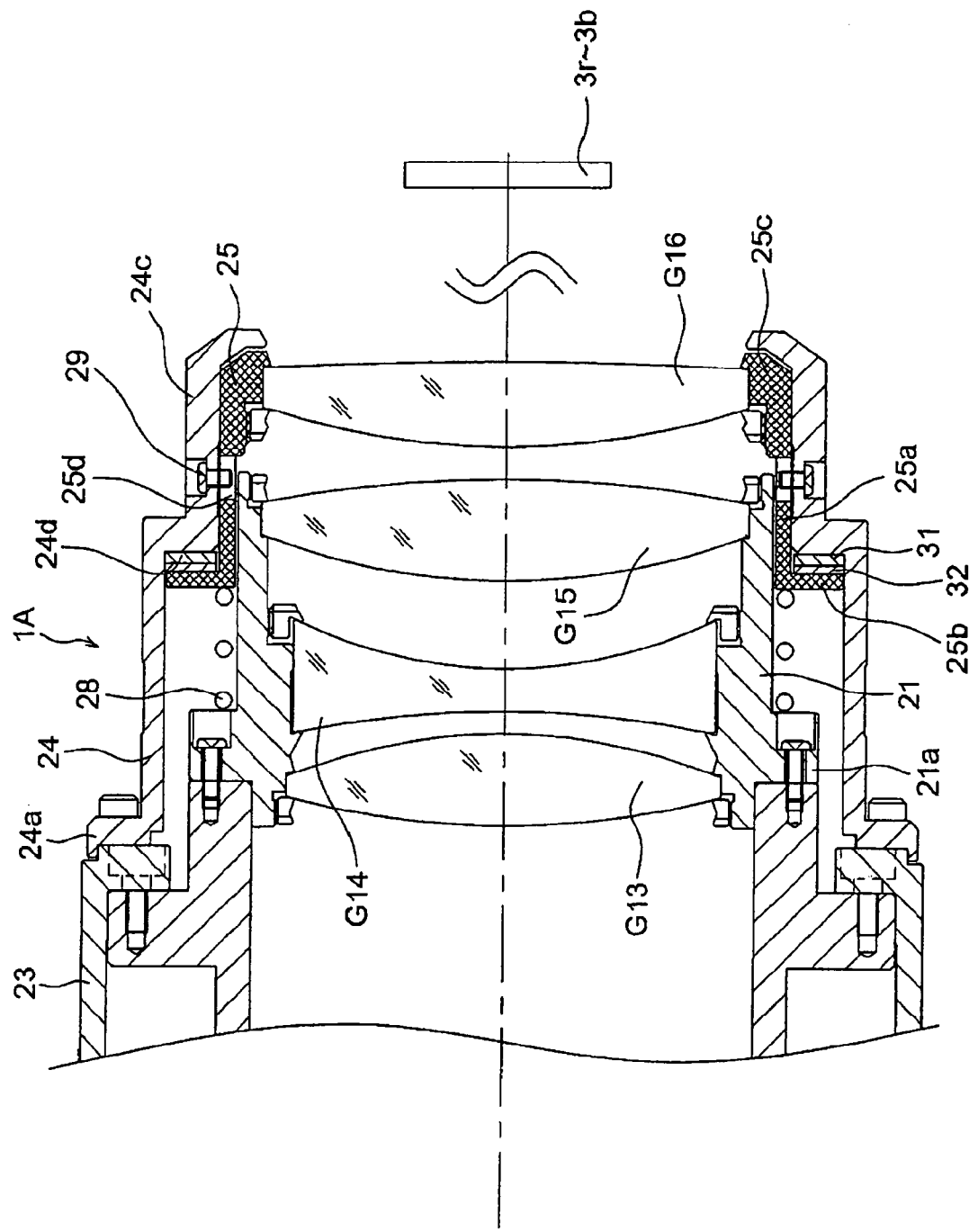
FIG. 12 is a cross-sectional view showing a second alternative (at normal temperature) for a projection lens system.
Figure 14:
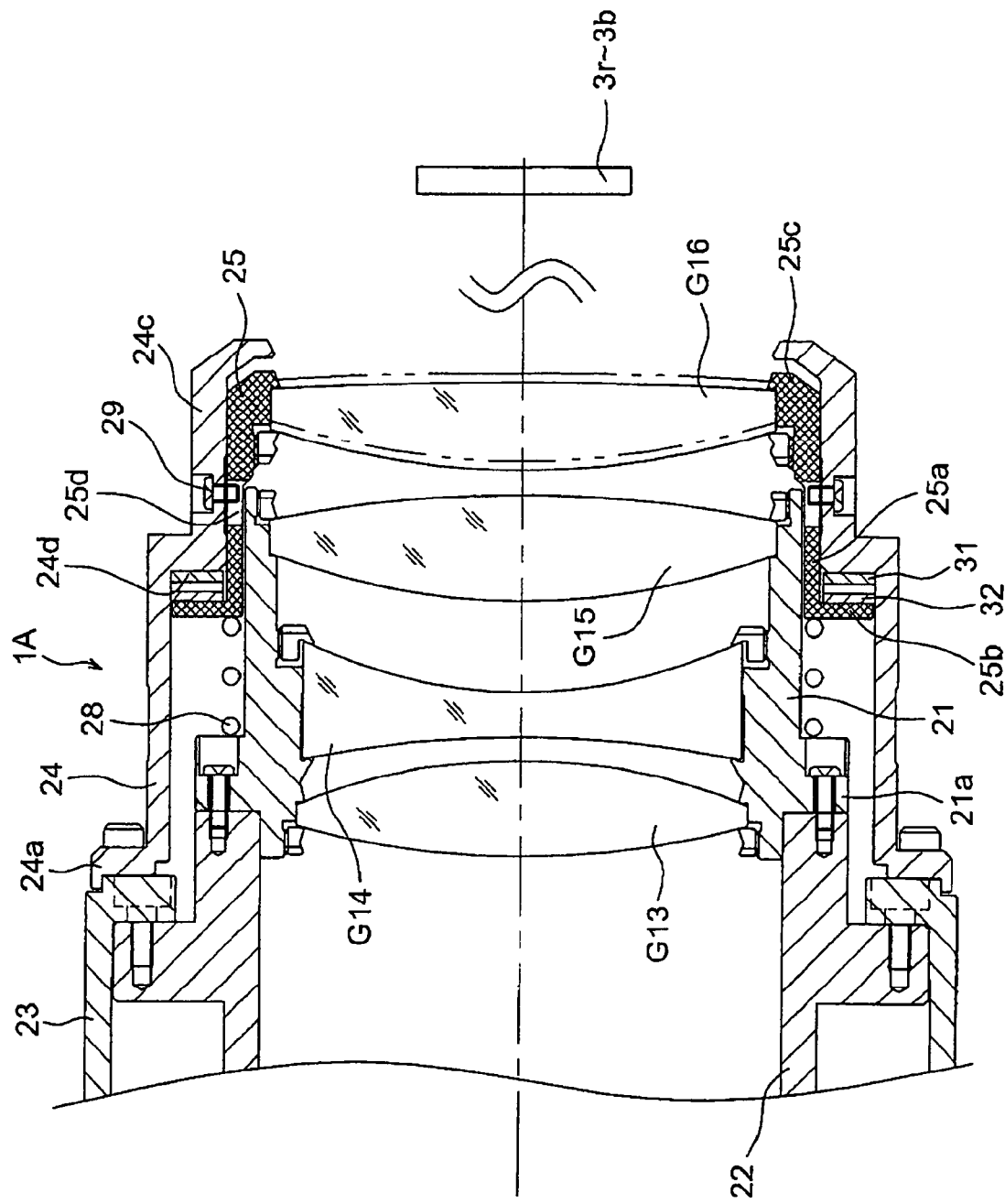
FIG. 14 is a cross-sectional view showing a second alternative (at increased temperature) for a projection lens system.

In the alternative configuration shown in FIG. 12 through FIG. 14, the form of the bimetal member is different from the first aspect. In this alternative configuration, the surfaces of the high-expansion sides 32a of three arc-shaped bimetal members 32 are fastened to a thin ring-shape base 31. The three arc-shape bimetal members 32 are positioned at equal-angle intervals (120° intervals) as seen from the optical axis direction. The surfaces on the low-expansion sides 32b of the bimetal members 32 are positioned on the side opposite the base 31. With the base 31 in contact with the reference surface 24d of the outer tube 24, the bimetal members 32 are positioned between the outer tube 24 and the flange portion 25b of the movable lens barrel 25. As shown in FIG. 14, upon an increase in temperature each of the bimetal members 32 is deformed, so that the thickness is increased, and by this means the movable lens barrel 25 is moved in the direction receding from the DMDs 3r to 3b, in opposition to the impelling force of the coil spring 28. By means of this alternative configuration, the amount of bimetal used can be decreased compared with the first aspect, and costs can be reduced. Further, while reliably preventing inclination and eccentricity, the movable lens barrel 25 can be smoothly moved at the time of an increase in temperature. The shape of the bimetal members on the base is not limited to an arc shape. For example, rectangular-shape bimetal members may be welded, crimped, or similar and fixed to the base. Moreover, the number of bimetal members on the base is not limited to three, but may for example be six or eight.

The bimetal member 27 in the first aspect is flat and ring-shaped; but the bimetal member may at normal temperature have a depressed ring shape on the low-expansion side 27a (a shape similar to the deformed shape when the bimetal member 27 in the first aspect, shown in FIG. 8C, is deformed due to an increase in temperature). By means of this shape, not only is the movable lens barrel 25 moved in the direction receding from the DMDs 3r to 3b upon an increase in temperature, but upon a decrease in temperature the movable lens barrel 25 can be moved in the direction approaching the DMDs 3r to 3b, so that shifts in the focal point upon a decrease in temperature can be corrected.

Figure 15:
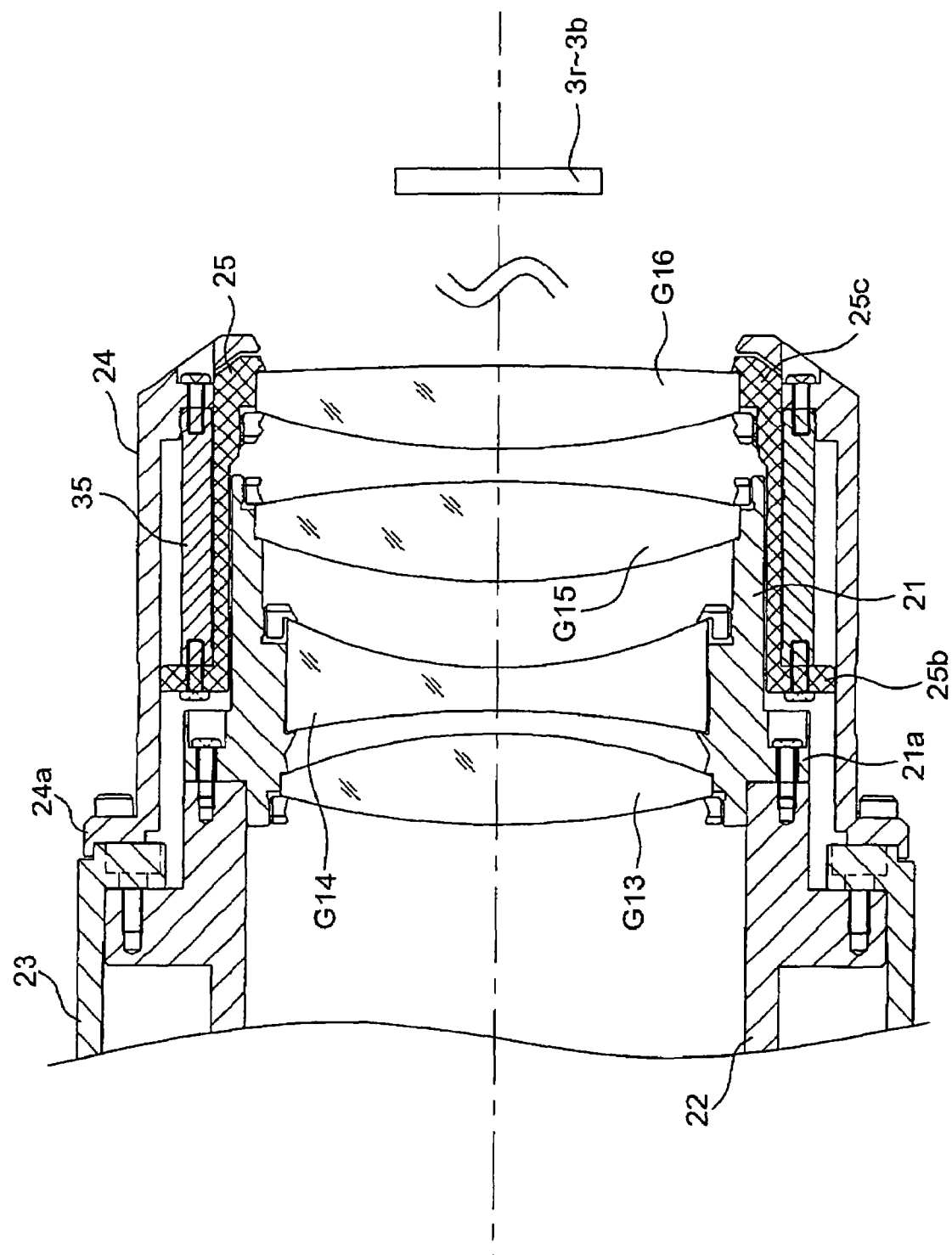
FIG. 15 is a cross-sectional view showing a third alternative for a projection lens system.

In the alternative configuration of FIG. 15, in place of the combination of a bimetal member and elastic means as the thermal deformation member, for example a member comprising an ultra-high-molecular-weight polyethylene (linear expansion coefficient $17.0\times10^{-5}$ (1/K)) or other resin material which undergoes reversible thermal expansion (a thermal expansion member 35) is comprised. In the example of FIG. 15, the thermal expansion member 35 is circular in shape; the front end is fixed by screwing into the flange portion 25b of the movable lens barrel 25, and the rear end is fixed by screws to the outer tube 24. The movable lens barrel 25 is fitted into the outer tube 24, and held so as to be movable in the optical axis direction. The shape of the thermal expansion member 35 is not limited to circular, and for example the flange of the movable lens barrel 25 and the outer tube 24 may be linked by a plurality of thermal expansion members with, for example, arc-shaped cross-sections. Upon an increase in temperature, the thermal expansion member 35 is lengthened, causing the movable lens barrel 25 (lens G16) to move in the direction receding from the DMD 3r to 3b, and the shift in focal point position of the projection lens system 1A is corrected. When the temperature returns to normal, the thermal expansion member 35 shrinks, and the movable lens barrel 25 (lens G16) returns to the initial position shown in FIG. 15. It is preferable that the thermal expansion member 35 comprise a material with linear expansion coefficient of $10\times10^{-5}$ (1/K) or greater. By using a material with a large linear expansion coefficient, an adequate amount of movement of the movable lens barrel 25 upon an increase in temperature can be secured, even when the total length of the thermal expansion member 35 is set comparatively short. As a result the thermal expansion member 35 can be reduced in size and cost. The movable lens barrel 25 and outer tube 24 are of aluminum, the linear expansion coefficient of which is $2.3\times10^{-5}$ (1/K), and the lengthening upon an increase in temperature of the thermal expansion member 35 is large compared with that of the movable lens barrel 25 and outer tube 24.

Figure 16:
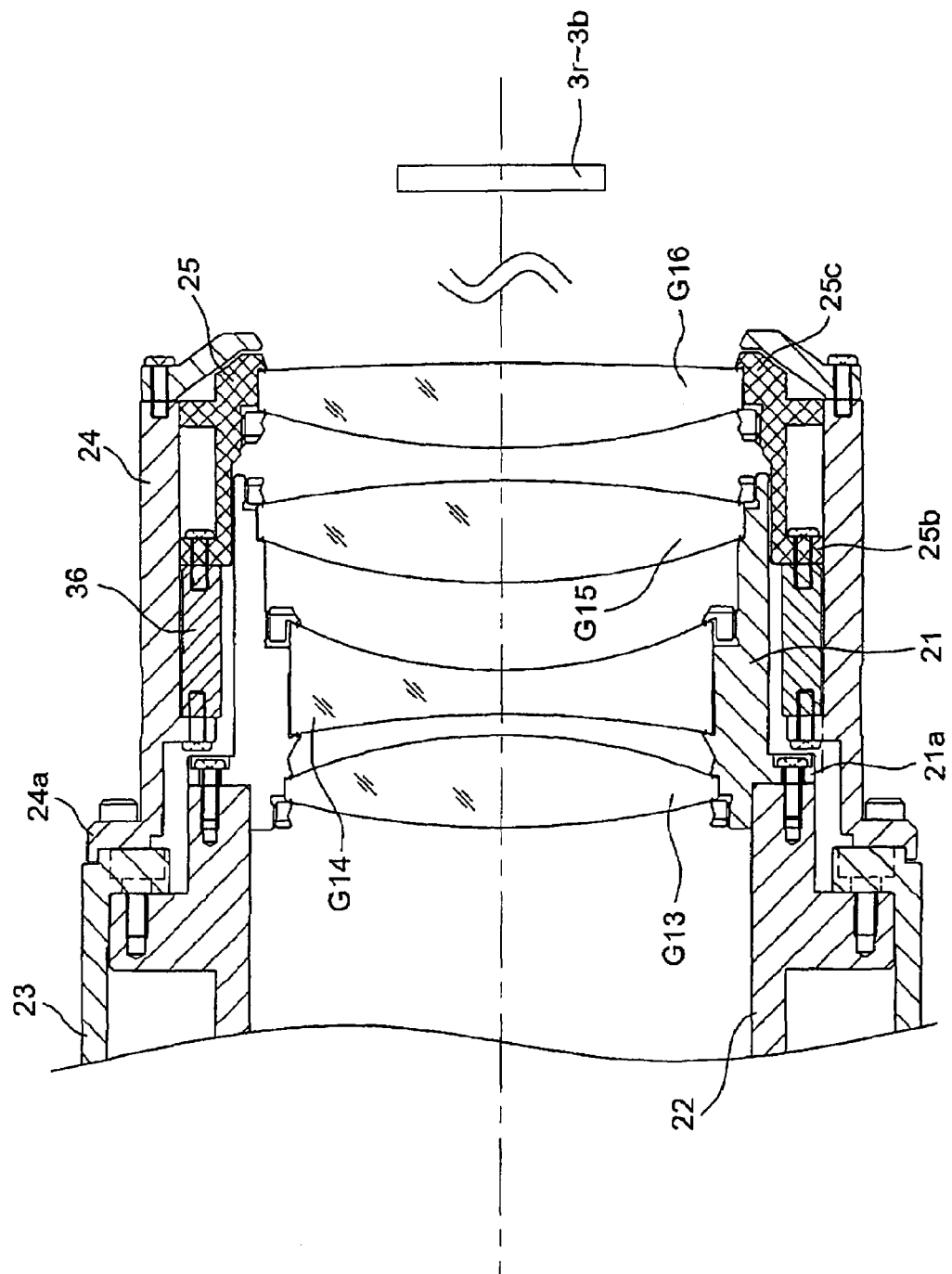
FIG. 16 is a cross-sectional view showing a fourth alternative for a projection lens system.

In the alternative configuration of FIG. 16, in place of a bimetal member and elastic means, a member is comprised which reversibly undergoes thermal shrinkage (thermal shrinkage member 36). The forward edge of the thermal shrinkage member 36 is fixed to the outer tube 24 by a spring stop; the rear edge is fixed to the flange portion 25b of the movable lens barrel 25 by a spring stop. Upon an increase in temperature, the thermal shrinkage member 36 shrinks, causing the movable lens barrel 25 (lens G16) to move in the direction receding from the DMDs 3r to 3b, correcting the shift in focal point position of the projection lens system 1A When the temperature returns to normal temperature the thermal shrinkage member 36 expands, and the movable lens barrel 25 (lens G16) returns to the initial position shown in FIG. 16.

Second Embodiment

Figure 17:
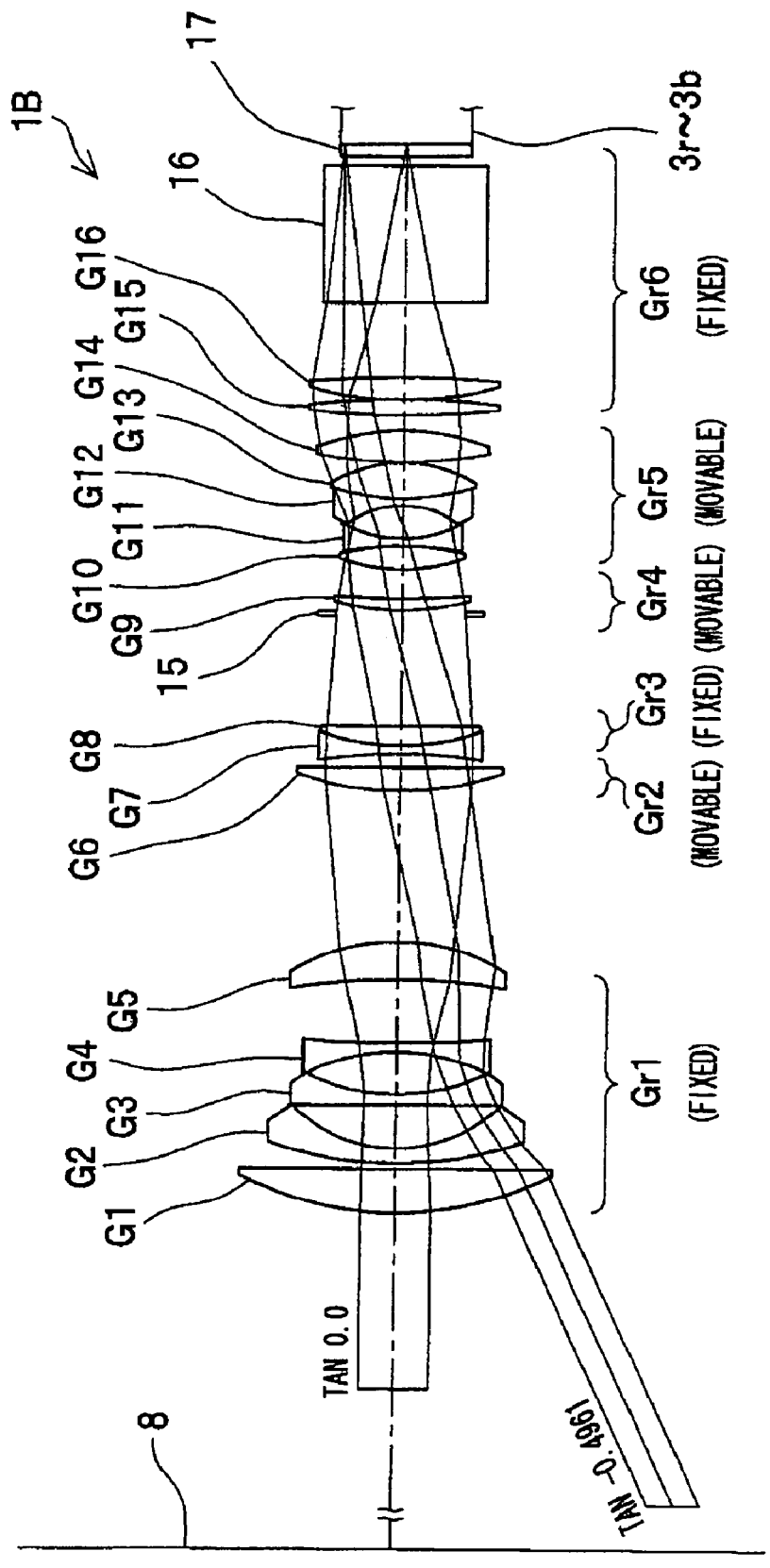
FIG. 17 is a schematic diagram showing the projection lens system of a projector in a second aspect of the invention.
Figure 18:
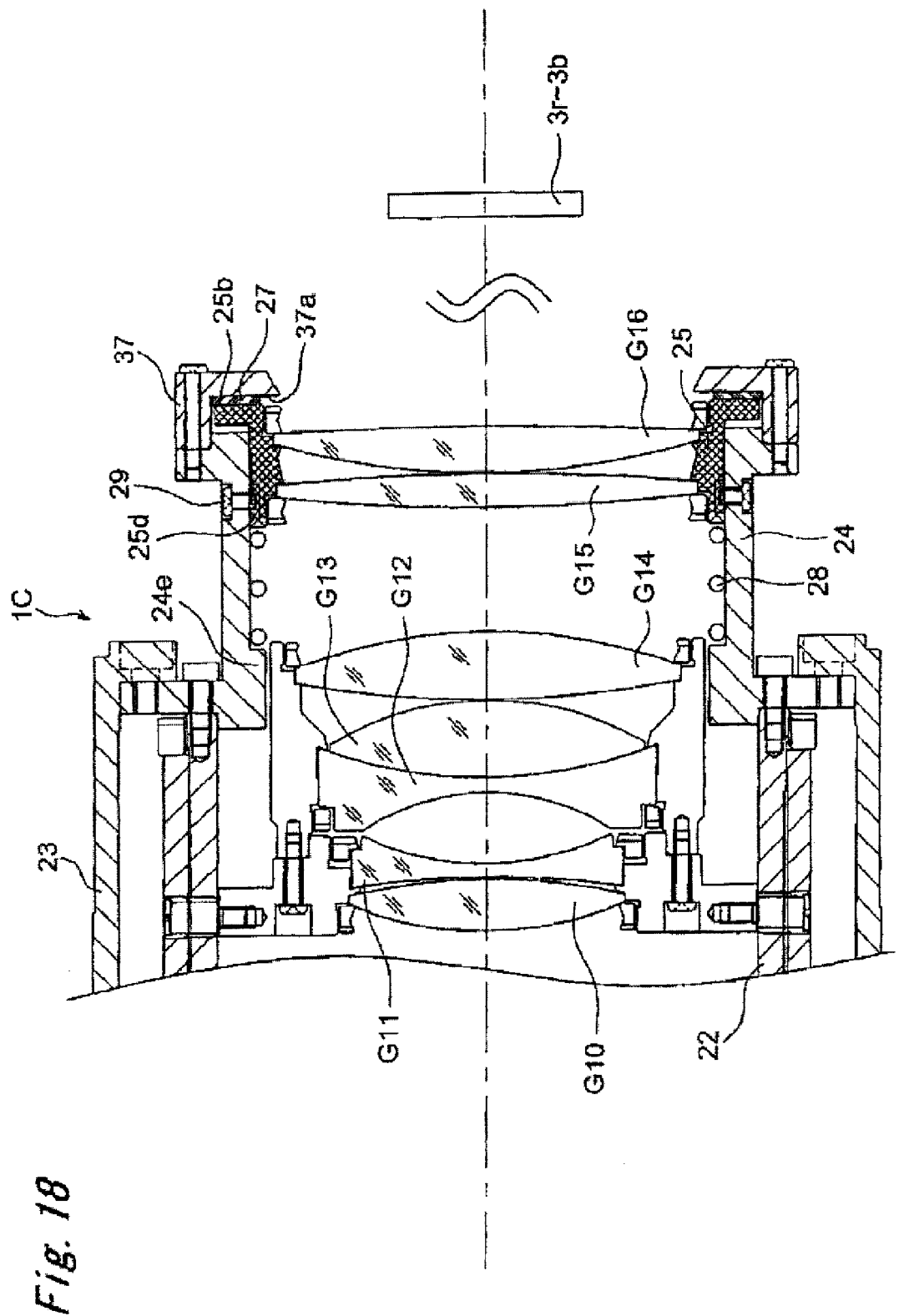
FIG. 18 is a cross-sectional view showing the projection lens system of the second aspect.

FIG. 17 and FIG. 18 show the projection lens system 1B of a second aspect of the invention. This projection lens system 1B forms a portion of a projector 2, similarly to the case of the first aspect, and similarly to the first aspect comprises a light source 4, illumination optical system 5, color separation/combination prism 6, total internal reflection prism 7, and screen 8 (see FIG. 4 to FIG. 6).

The projection lens system 1B comprises 16 lenses G1 to G16 and a diaphragm 15, and has telecentric properties. The radii of curvature of the lenses G1 to G16, the distances on the optical axis between the lens surfaces r1 to r39 of the lenses G1 to G16, the refractive indices N1 to N20, and the Abbe numbers ν1 to ν20, are as indicated in Table 5 and Table 6 below.

TABLE 5

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| LENS G1 | r1: 99.180 | — | | |
| | | d1: 11.431 | N1: 1.58913 | ν1: 61.25 |
| | r2: 11824.525 | | | |
| | | d2: 1.851 | | |
| LENS G2 (ANOMALOUS DISPERSION LENS) | r3: 108.956 | | | |
| | | d3: 4.196 | N2: 1.48749 | ν2: 70.44 |
| | r4: 42.769 | | | |
| | | d4: 12.004 | | |
| LENS G3 | r5: −2307.391 | | | |
| | | d5: 2.900 | N3: 1.58913 | ν3: 61.25 |
| | r6: 63.884 | | | |
| | | d6: 11.679 | | |
| LENS G4 | r7: −57.327 | | | |
| | | d7: 2.600 | N4: 1.72342 | ν4: 37.99 |
| | r8: 281.604 | | | |
| | | d8: 17.174~17.174~17.174 | | |

TABLE 5-continued

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| LENS G5 | r9: −216.928 | | | |
| | | d9: 10.000 | N5: 1.71300 | ν5: 53.94 |
| | r10: −60.538 | | | |
| | | d10: 40.810~25.716~13.175 | | |
| LENS G6 | r11: 81.424 | | | |
| | | d11: 6.300 | N6: 1.74330 | ν6: 49.22 |
| | r12: 1059.311 | | | |
| | | d12: 3.985~19.079~31.620 | | |
| LENS G7 | r13: −139.477 | | | |
| | | d13: 2.200 | N7: 1.51680 | ν7: 64.20 |
| | r14: 66.098 | | | |
| | | d14: 0.010 | | |
| LENS G8 | r15: 66.098 | | N8: 1.55000 | ν8: 47.00 |
| | | d15: 4.963 | | |
| | r16: 597.850 | | N9: 1.83400 | ν9: 37.34 |
| | | d16: 30.070~20.351~10.286 | | |
| DIAPHRAGM | r17: ∞ | — | — | — |

TABLE 6

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| DIAPHRAGM | r17: ∞ | — | — | — |
| | | d17: 1.000 | | |
| LENS G9 (ANOMALOUS DISPERSION LENS) | r18: 66.298 | | | |
| | | d18: 3.425 | N10: 1.49700 | ν10: 81.61 |
| | r19: 209.024 | | | |
| | | d19: 7.581~11.188~16.210 | | |
| LENS G10 (ANOMALOUS DISPERSION LENS) | r20: 46.300 | | | |
| | | d20: 6.522 | N11: 1.49700 | ν11: 81.61 |
| | r21: −74.547 | | | |
| | | d21: 0.233 | | |
| LENS G11 (ANOMALOUS DISPERSION LENS) | r22: −123.878 | | | |
| | | d22: 1.700 | N12: 1.64769 | ν12: 33.84 |
| | r23: 36.075 | | | |
| | | d23: 8.986 | | |
| LENS G12 (ANOMALOUS DISPERSION LENS) | r24: −28.373 | | N13: 1.80610 | ν13: 33.27 |
| | | d24: 1.900 | | |
| | r25: 63.891 | | N14: 1.55000 | ν14: 47.00 |
| | | d25: 0.010 | | |
| LENS G13 (ANOMALOUS DISPERSION LENS) | r26: 63.891 | | | |
| | | d26: 9.525 | N15: 1.61800 | ν15: 63.39 |
| | r27: −39.913 | | | |
| | | d27: 0.100 | | |
| LENS G14 (ANOMALOUS DISPERSION LENS) | r28: 136.466 | | | |
| | | d28: 8.543 | N16: 1.49700 | ν16: 81.61 |
| | r29: −69.653 | | | |
| | | d29: 4.196~10.308~15.351 | | |
| LENS G15 (ANOMALOUS DISPERSION LENS. TEMPERATURE CORRECTION) | r30: 248.660 | | | |
| | | d30: 4.180 | N17: 1.49700 | ν17: 81.61 |
| | r31: −280.599 | | | |
| | | d31: 0.100 | | |
| LENS G16 (TEMPERATURE CORRECTION) | r32: 100.092 | | | |
| | | d32: 5.761 | N18: 1.78472 | ν18: 25.72 |
| | r33: 100.092 | | | |
| | | d33: 20.000 | | |
| COLOR-SEPARATION PRISM | r34: ∞ | | | |
| | | d34: 36.000 | N19: 1.56883 | ν19: 56.04 |
| | r35: ∞ | | | |
| | | d35: 4.000 | | |
| COVER GLASS | r36: ∞ | | | |
| | | d36: 3.000 | N20: 1.48749 | ν20: 70.44 |
| | r37: ∞ | | | |

The projection lens system 1A comprises, in order from the side of the screen 8 (the enlarged side), an optical element group Gr1 having negative power; an optical element group Gr2 having positive power; an optical element group Gr3 having negative power; an optical element group Gr4 having positive power, and comprising a diaphragm 15; an optical element group Gr5 having negative power; and an optical element group Gr6 having positive power. Eight lenses G1 to G8 are positioned on the screen 8 side of the diaphragm 15. Of these lenses G1 to G8, lenses G1, G5, G6 and G8 have positive power, and lenses G2, G3, G4 and G7 have negative power. In particular, lens G2 with negative power is a lens with considerable anomalous dispersion, having an Abbe number above 70. The eight lenses G9 to G16 are positioned on the side of the DMDs 3r to 3b (reduced side) of the diaphragm 15. Of these, lenses G9, G10, G14 and G15 have positive power, and lenses G11 and G12 have negative power. In particular, lenses G9, G10, G14 and G15 are lenses with considerable anomalous dispersion, having an Abbe number above 70.

The optical element group Gr1, comprising the five lenses G1 to G5 closest to the screen 8, is fixed even during zooming. One lens G6 (optical element group Gr2) on the rear side of the optical group Gr1 can move in the optical axis direction in order to perform zooming. The optical element group Gr3, comprising two lenses G7, G8 on the rear side of lens G6, is fixed even during zooming. The lens G9 (optical element group Gr4) on the rear side of optical element group Gr3, and the optical element group Gr5 comprising the five lenses G10 to G14 on the rear side thereof, move in the optical axis direction in order to adjust the back focal length, which changes when lens G6 (optical element group Gr2) moves. The optical element group Gr6, comprising the two lenses G15 and G16, prism 16, and cover glass 17, is fixed even during zooming.

Figure 19:
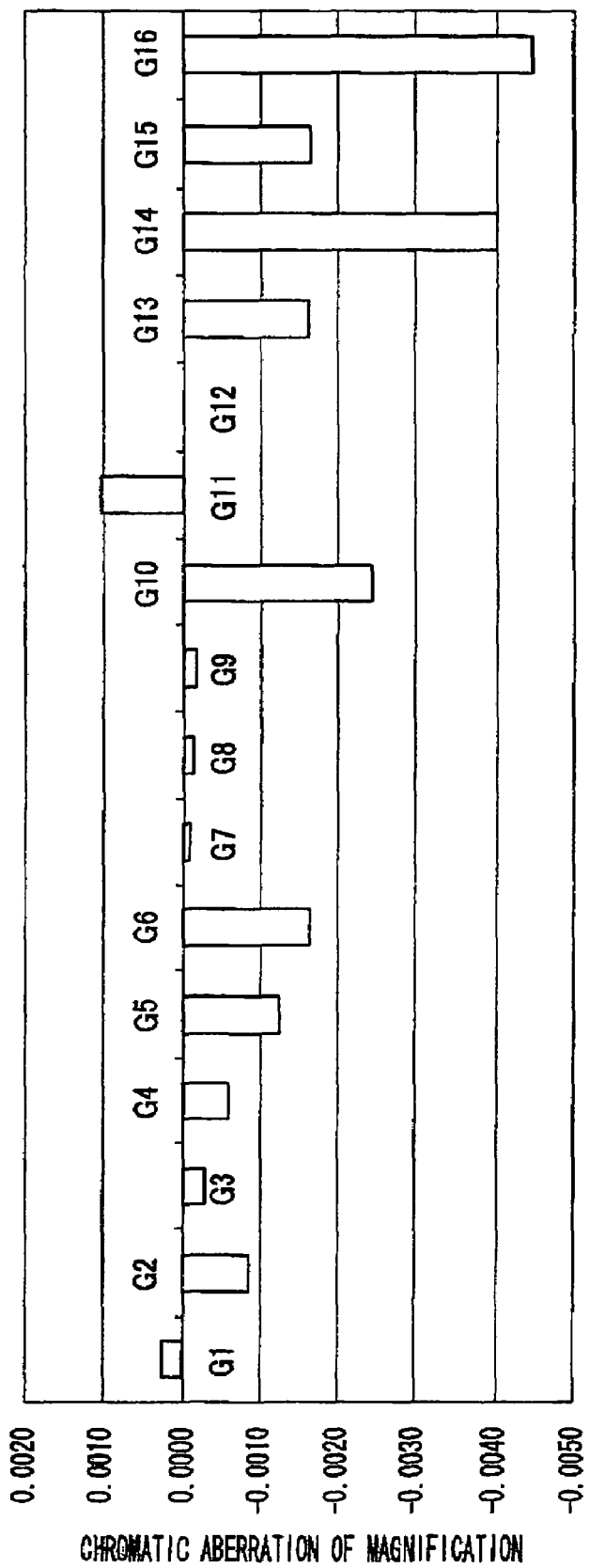
FIG. 19 is a graph showing the degree of efficacy with respect to chromatic aberration of magnification of individual lenses comprised by the projection lens system of the second aspect.
Figure 20:
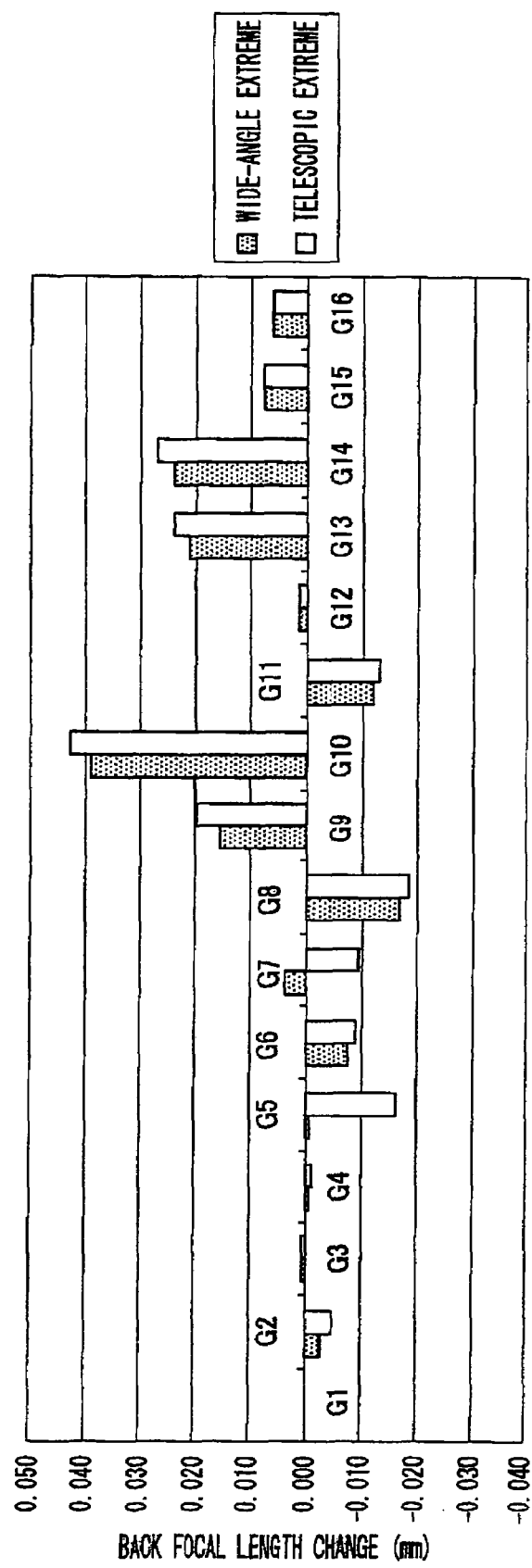
FIG. 20 is a graph showing the degree of efficacy with respect to temperature characteristics of individual lenses comprised by the projection lens system of the second aspect.

FIG. 19 shows the efficacy with respect to chromatic aberration of magnification of each of the lenses G1 to G16 of the projection lens system 1B of this aspect, and FIG. 20 shows the degree of efficacy with respect to changes to the back focal length LB of each of the lenses G1 to G16 when the temperature has risen 30° C. From FIG. 19 and FIG. 20 it is seen that the anomalous dispersion lenses G10, G13, G14 with positive power, positioned on the rear side of the diaphragm 15, contribute to correction of chromatic aberration of magnification, but greatly affect changes in the focal point position upon temperature increases. In this aspect, among the lenses G1 to G16 comprised by the projection lens system 1B, the two lenses G15, G16 positioned closest to the DMDs 3r to 3b are moved in the direction receding from the DMDs 3r to 3b (in the direction to shift the focal point of the projection lens system 1B to the surface side of the DMDs 3r to 3b) upon an increase in temperature, and by this means the shift in focal point position of the projection lens system 1B at the time of an increase in temperature is corrected.

As indicated in the above Table 3, whereas the back focal length LB of the projection lens system 1B of this aspect is 63.5 mm, and the equivalent back focal length in air LBair is 49.5 mm, the focal length of lenses G15 and G16 is 77.2 mm, satisfying the value in equation (1) above of 1.56.

Further, as indicated in Table 3 above, the ratio of the air equivalent back focal length LBair of the projection lens system 1B of this aspect to the diagonal length of the DMDs 3r to 3b is set to 2.0, satisfying the above equation (2).

FIG. 18 shows an example of a mechanism to displace the lenses G15, G16 to the side of the screen 8 at the time of an increase in temperature. In this example, the outer tube 24 comprises a ring-shape lid member 37 on the rear edge, and the inner surface of this lid member 37 forms a reference surface 37a. By fitting the movable lens barrel 25 into the outer tube 24, the movable lens barrel 25 can be held so as to enable movement in the optical axis direction. The movable lens barrel 25 comprises a flange portion 25b on the rear-edge side, and a ring-shape bimetal member 27, similar to that of the first aspect (see FIG. 7), is positioned between the reference surface 37a and the flange portion 25b. A coil spring 28 which elastically impels the movable lens barrel 25 is positioned between the front edge of the movable lens barrel 25 and a receiving portion 24e provided on the forward edge side of the outer tube 24, in the compressed state. In order to prevent inclination and eccentricity, it is preferable that the length in the optical axis direction of the contact portion between the movable lens barrel 25 and the outer tube 24 be 15 mm or greater at normal temperature.

Due to the increase in temperature of the projection lens system 1B caused by heat generated by the light source 4 (see FIG. 5) and similar causes, the back focal length is lengthened, and the focal point of the projection lens system 1B is shifted to the rear surface side of the DMDs 3r to 3b. On the other hand, at the time of this increase in temperature, the bimetal member 27 is deformed and the thickness is increased, so that the movable lens barrel 25 moves in the direction receding from the DMDs 3r to 3b, and the lenses G15 and G16 held by the movable lens barrel 25 also move in this direction. This movement of the lenses G15, G16 acts to shift the focal point of the projection lens system 1B to the surface side of the DMDs 3r to 3b. By thus moving the movable lens barrel 25 (lenses G15, G16) by means of thermal deformation of the bimetal member 27, the shift in focal point position of the projection lens system 1B at the time of an increase in temperature can be corrected.

In other respects the configuration and action of the second aspect are similar to those of the first aspect, and so the same elements are assigned the same symbols, and explanations are omitted. The alternative configurations explained referring to FIG. 11 through FIG. 16 can also be applied to the second aspect.

Third Embodiment

Figure 21:
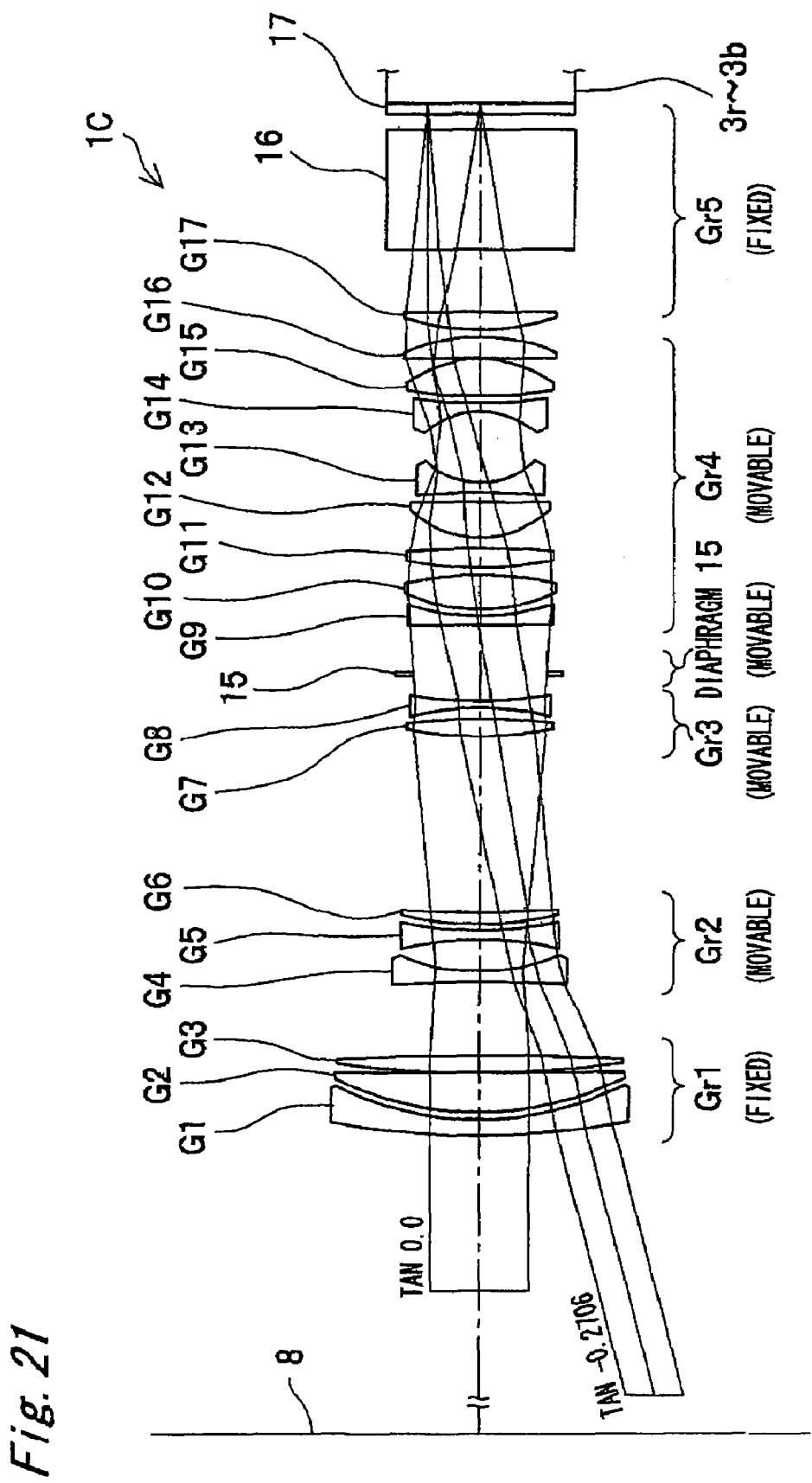
FIG. 21 is a cross-sectional view showing the projection lens system of a projector in a third aspect.

FIG. 21 shows the projection lens system 1C of a third aspect of the invention. This projection lens system 1C forms a portion of a projector 2, similarly to the case of the first aspect, and similarly to the first aspect comprises a light source 4, illumination optical system 5, color separation/combination prism 6, total internal reflection prism 7, and screen 8 (see FIG. 4 to FIG. 6).

The projection lens system 1C comprises 17 lenses G1 to G17 and a diaphragm 15, and has telecentric properties. The radii of curvature of the lenses G1 to G17, the distances on the optical axis between the lens surfaces r1 to r39 of the lenses G1 to G17, the refractive indices N1 to N19, and the Abbe numbers ν1 to ν19, are as indicated in Table 7 and Table 8 below.

TABLE 7

| OPTICAL ELEMENT | RADIUS OF CURVATURE | DISTANCE BETWEEN SURFACES ON OPTICAL AXIS | REFRACTIVE INDEX | ABBE NUMBER |
| --- | --- | --- | --- | --- |
| LENS G1 | r1: 249.283 | — | | |
| | | d1: 5.000 | N1: 1.64769 | ν1: 33.84 |
| | r2: 108.596 | | | |
| | | d2: 2.324 | | |

TABLE 7-continued

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| LENS G2 | r3: 111.490 | | | |
| | | d3: 11.725 | N2: 1.60311 | ν2: 60.69 |
| | r4: 6391.410 | | | |
| | | d4: 0.200 | | |
| LENS G3 (ANOMALOUS DISPERSION LENS) | r5: 328.894 | d5: 5.169 | N3: 1.49700 | ν3: 81.61 |
| | r6: −1497.140 | | | |
| | | d6: 22.616~53.922~76.168 | | |
| LENS G4 (ANOMALOUS DISPERSION LENS) | r7: −614.307 | d7: 3.500 | N4: 1.48749 | ν4: 70.44 |
| | r8: 63.742 | | | |
| | | d8: 10.105 | | |
| LENS G5 (ANOMALOUS DISPERSION LENS) | r9: −112.618 | d9: 2.500 | N5: 1.48749 | ν5: 70.44 |
| | r10: 109.010 | | | |
| | | d10: 2.000 | | |
| LENS G6 | r11: 94.557 | | | |
| | | d11: 3.510 | N6: 1.75520 | ν6: 27.53 |
| | r12: 295.388 | | | |
| | | d12: 53.826~22.285~2.000 | | |
| LENS G7 | r13: 103.051 | | | |
| | | d13: 5.731 | N7: 1.83400 | ν7: 37.34 |
| | r14: −166.352 | | | |
| | | d14: 3.236 | | |
| LENS G8 | r15: −98.950 | | | |
| | | d15: 2.000 | N8: 1.64769 | ν8: 33.84 |
| | r16: 138.517 | | | |
| | | d16: 8.238~5.395~3.939 | | |
| DIAPHRAGM | r17: ∞ | — | — | — |

TABLE 8

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| DIAPHRAGM | r17: ∞ | — | — | — |
| | | d17: 15.111~7.341~2.087 | | |
| LENS G9 | r18: −2693.603 | | | |
| | | d18: 2.500 | N9: 1.51680 | ν9: 64.20 |
| | r19: 69.013 | | | |
| | | d19: 2.000 | | |
| LENS G10 (ANOMALOUS DISPERSION LENS) | r20: 58.185 | d20: 10.291 | N10: 1.49700 | ν10: 81.61 |
| | r21: −124.136 | | | |
| | | d21: 2.437 | | |
| LENS G11 (ANOMALOUS DISPERSION LENS) | r22: 96.604 | d22: 5.770 | N11: 1.49700 | ν11: 81.61 |
| | r23: −539.849 | | | |
| | | d23: 3.371 | | |
| LENS G12 (ANOMALOUS DISPERSION LENS) | r24: 32.815 | d24: 10.449 | N12: 1.49700 | ν12: 81.61 |
| | r25: 1408.193 | | | |
| | | d25: 3.169 | | |
| LENS G13 | r26: −253.779 | | | |
| | | d26: 3.000 | N13: 1.58144 | ν13: 40.89 |
| | r27: 25.538 | | | |
| | | d27: 21.570 | | |
| LENS G14 | r28: −27.133 | | | |
| | | d28: 2.500 | N14: 1.51680 | ν14: 64.20 |
| | r29: 153.927 | | | |
| | | d29: 2.000 | | |
| LENS G15 (ANOMALOUS DISPERSION LENS) | r30: 150.267 | d30: 11.413 | N15: 1.49700 | ν15: 81.61 |
| | r31: −39.989 | | | |
| | | d31: 0.200 | | |
| LENS G16 (ANOMALOUS DISPERSION LENS) | r32: −4350.096 | d32: 6.384 | N16: 1.49700 | ν16: 81.61 |
| | r33: −63.182 | | | |
| | | d33: 2.000~12.851~17.602 | | |
| LENS G17 | r34: 77.494 | | | |

TABLE 8-continued

| OPTICAL ELEMENT | RADIUS OF CURVATURE | DISTANCE BETWEEN SURFACES ON OPTICAL AXIS | REFRACTIVE INDEX | ABBE NUMBER |
|---|---|---|---|---|
| (ANOMALOUS DISPERSION LENS. TEMPERATURE CORRECTION) | r35: −55679.289 | d34: 5.450<br>d35: 19.000 | N17: 1.49700 | v17: 81.61 |
| COLOR-SEPARATION PRISM | r36: ∞<br>r37: ∞ | d36: 36.000<br>d37: 5.000 | N18: 1.56883 | v18: 56.04 |
| COVER GLASS | r38: ∞<br>r39: ∞ | d38: 3.000<br>— | N19: 1.48749 | v19: 70.44 |

The projection lens system 1A comprises, in order from the side of the screen 8 (enlarged side), an optical element group Gr1 having positive power; an optical element group Gr2 having negative power; an optical element group Gr3 having positive power; an optical element group Gr4 having positive power; and an optical element group Gr5 having positive power. Eight lenses G1 to G8 are positioned on the side of the screen 8 from the diaphragm 15. Of these lenses G1 to G8, lenses G2, G3, G6, and G7 have positive power, while lenses G1, G4, G5, and G8 have negative power. In particular, positive-power lens G3 and negative-power lenses G4 and G5 are lenses with substantial anomalous dispersion, having Abbe numbers above 70. On the side of the DMDs 3r to 3b (reduced side) from the diaphragm 15 are positioned the nine lenses G9 to G17. Of these, lenses G10, G11, G12, G15, G16, and G17 have positive power, while lenses G9, G13 and G14 have negative power. In particular, lenses G10, G11, G12, G15, G16, and G17 are lenses with large anomalous dispersion, with Abbe numbers above 70.

The optical element group Gr1, comprising the three lenses G1 to G3 closest to the screen 8, is fixed even during zooming. The optical element group Gr2, comprising the three lenses G4 to G6 on the rear side of the optical element group Gr1, can move in the optical axis direction to perform zooming. The optical element group Gr3 (Lenses G7, G8) on the rear side of the optical element group Gr2 and the optical element group Gr5 (lenses G9 to G16) move in the optical axis direction in order to correct the back focal length which changes when the optical element group Gr2 (lenses G4 to G6) moves. The diaphragm 15 also moves during zooming. The optical element group Gr5 comprising the lens G17 is fixed even during zooming.

Figure 22:
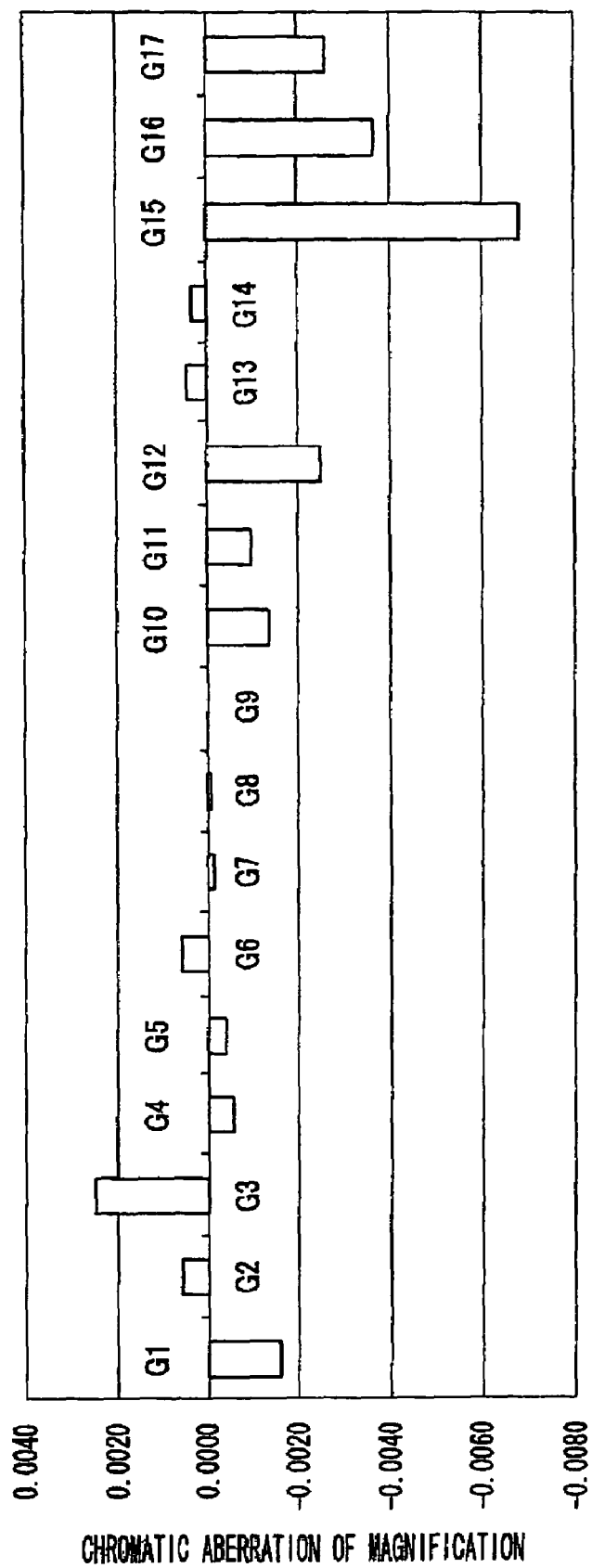
FIG. 22 is a graph showing the degree of efficacy with respect to chromatic aberration of magnification of individual lenses comprised by the projection lens system of the bird aspect.
Figure 23:
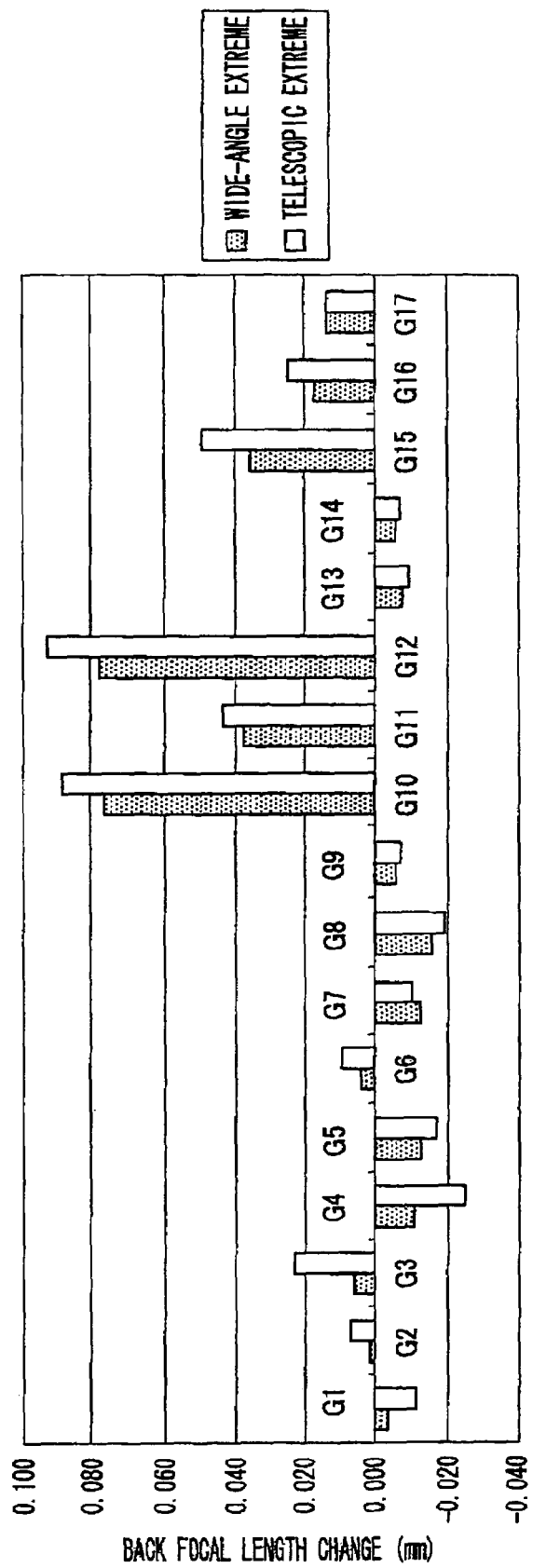
FIG. 23 is a graph showing the degree of efficacy with respect to temperature characteristics of individual lenses comprised by the projection lens system of the third aspect.

FIG. 22 shows the efficacy with respect to chromatic aberration of magnification of each of the lenses G1 to G17 of the projection lens system 1C of this aspect, and FIG. 23 shows the efficacy with respect to changes in back focal length LB of each of the lenses G1 to G17 of the case of an increase in temperature by 30° C. From FIG. 22 and FIG. 23, it is seen that while the anomalous dispersion lenses G10 to G12 and G15 to G17, having positive power and positioned on the rare of the diaphragm 15, contribute to correct the chromatic aberration of magnification, these lenses have a large effect on movement of the focal point position during temperature increases. In this aspect, among the lenses G1 to G17 comprised by the projection lens system 1C, the one lens G17 positioned closest to the DMDs 3r to 3b is moved in the direction receding from the DMDs 3r to 3b (in the direction to shift the focal point of the projection lens system 1A to the surface side of the DMDs 3r to 3b), and by this means the shift in focal point position of the projection lens system 1A at the time of temperature increase is corrected. The specific mechanism for moving the lens G17 upon a temperature increase is the same as in the first aspect (see FIG. 7 to FIG. 10).

As indicated in Table 3 above, the back focal length LB of the projection lens system 1C of this aspect is 63.5 mm, and the air equivalent back focal length LBair is 49.5 mm, whereas the focal length of lens G17 is 155.7 mm, set to result in a ratio of 3.15 which satisfies the above equation (1).

Further, as indicated in Table 3 above, for the projection lens system 1C of this aspect the ratio of the air equivalent back focal length LBair to the diagonal length of the DMDs 3r to 3b is set to 2.0, satisfying the above equation (2).

In other respects the configuration and action of the third aspect are similar to those of the first aspect, and so the same elements are assigned the same symbols, and explanations are omitted. The alternative configurations explained referring to FIG. 11 through FIG. 16 can also be applied to the third aspect.

Fourth Embodiment

Figure 24:
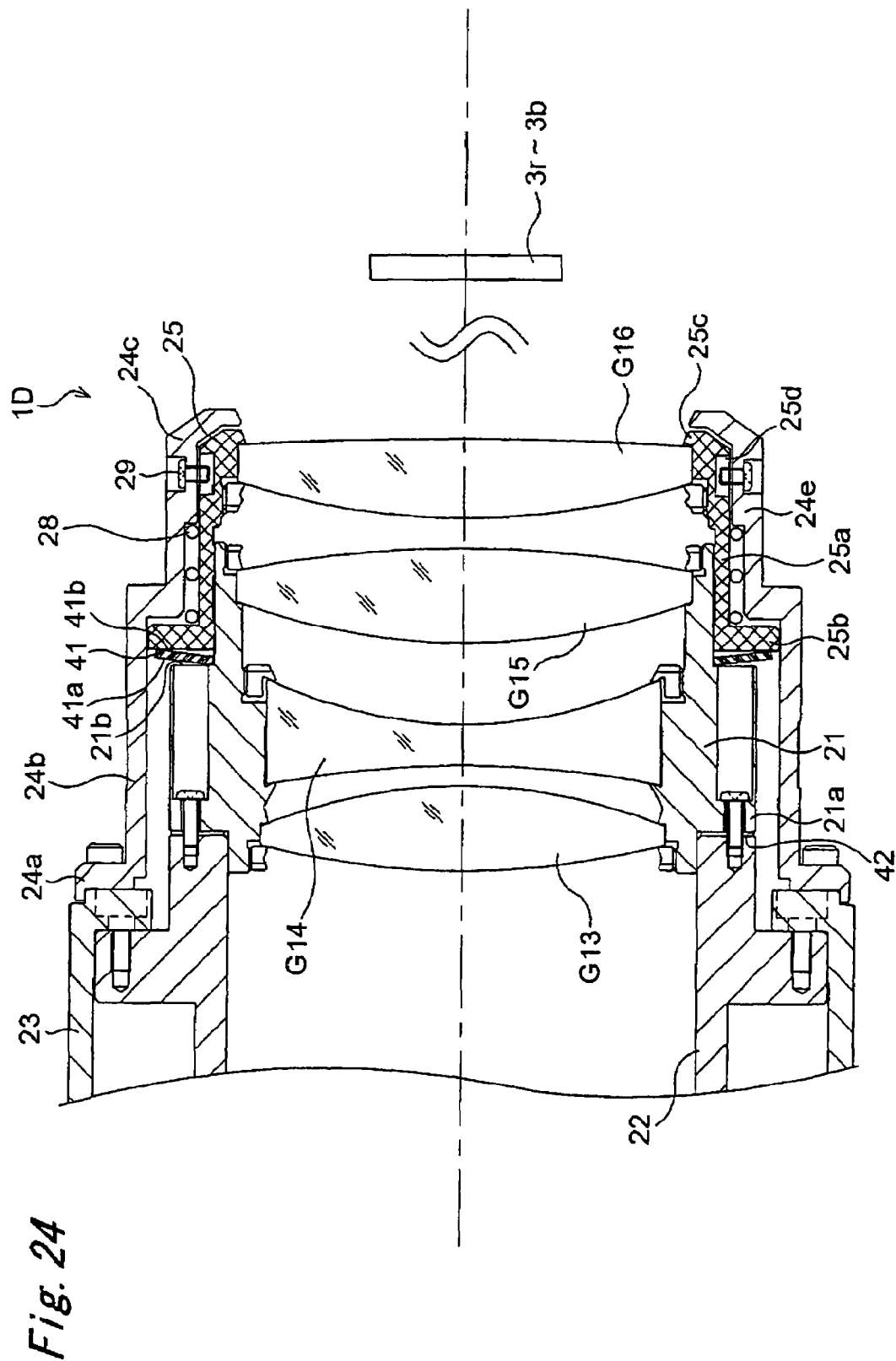

FIG. 24 shows the projection lens system 1D of another aspect of the invention. This projection lens system 1D forms a portion of a projector 2, similarly to the case of the first aspect, and similarly to the first aspect comprises a light source 4, illumination optical system 5, color separation/combination prism 6, total internal reflection prism 7, and screen 8 (see FIG. 4 to FIG. 6). The movable lens barrel 25 holding the lens G16, the position of which is displaced to perform correction, is fitted externally onto the fixed lens barrel 21 to enable free movement in the optical axis direction.

The end surface on the side of the DMDs 3r to 3b of the fixed lens barrel 21, which is screwed into and fixed to the main lens barrel 22, comprises a reference surface 21b perpendicular to the optical axis. A bimetal member 41 is positioned between this reference surface 21b and the surface on the screen side of a flange portion 25b of the movable lens barrel 25. Referring to FIGS. 25A through 25C, the bimetal member 41 has a ring shape with the high-expansion side 41b depressed compared with the low-expansion side 27a, and is placed in an orientation with the low-expansion side 41a facing the forward side (side of the screen 8), and the high-expansion side 41b facing the rear side (DMDs 3r to 3b).

A coil spring 28 in a compressed state is positioned between the surface on the side of the DMDs 3r to 3b of the flange portion 25b of the movable lens barrel 25, and the ring-shaped receiving portion 24e protruding inward from the inner surface of the small-diameter portion 24c of the outer tube 24. This coil spring 28 elastically impels the movable lens barrel 25 holding lens G16 to the forward side (the screen side in the optical axis direction), and has the function of elastically pressing the flange portion 25b of the movable lens barrel 25 against the reference surface 21b with the bimetal member 41 intervening. The movable lens barrel 25 may be impelled by elastic means other than the coil spring 28.

As shown in FIG. 25C, at the time of an increase in temperature, the bimetal member 41 attempts to curve toward the low-expansion side 41a, and so the thickness in the optical axis direction of the bimetal member 41 decreases (see symbol t in FIG. 25C). The movable lens barrel 25 is impelled toward the screen by the coil spring 28, and so moves toward the screen by an amount corresponding to the amount of decrease t in the thickness of the bimetal member 41. As a result, the lens G16 held by the movable lens barrel 25 also moves in the same direction, and so the shift in focal point position at the time of the increase in temperature can be corrected. A decrease in temperature is accompanied by deformation of the bimetal member 41 in the direction of an increase in thickness, in opposition to the impelling force of the coil spring 28, so that the movable lens barrel 25 returns to the initial position.

In this aspect, the construction is simple in that the reference surface 21b is provided not on the outer tube 24, but on the fixed lens barrel 21. Further, when an interval correction washer 42 is inserted between the main lens barrel 22 and the fixed lens barrel 21 in order to correct for curvature of field, spherical aberration, and other aberrations arising due to manufacturing errors in lenses and lens barrels, the movable lens barrel 25 is also displaced in the direction of the DMDs 3b to 3r in concert with displacement of the fixed lens barrel 21, so that insertion of the interval correction washer 42 does not cause a change in the interval between the movable lens barrel 25 and the fixed lens barrel 21.

In other respects the configuration and action of the fourth aspect are similar to those of the first aspect, and so the same elements are assigned the same symbols, and explanations are omitted.

This invention was explained for an example of a front-projection type projector; but this invention can also be applied to the projection lens systems of other projection-type image display devices, including rear-projection type projectors. Further, the image formation device is not limited to reflection-type elements such as DMDs, but can be used with CRTs, EL elements, and other emissive elements.

What is claimed is:

1. A projection lens unit comprising:
   a projection lens system which enlarges and projects image light from an image formation device onto a screen; and a lens barrel which holds lenses of the projection lens system, wherein
   the lens barrel comprises:
   a movable lens barrel which holds one or a plurality of lenses, among the lenses of the projection lens system, having positive power and positioned closest to a side of the image formation device;
   a holding tube which holds the movable lens barrel so as to be movable in an optical axis direction;
   a reference surface perpendicular to the optical axis;
   a thermal deformation member including a bimetal member which is deformed so as to increase a thickness thereof at the time of a temperature increase and which is disposed between the reference surface and the movable lens barrel; and
   an elastic member which presses the movable lens barrel and the bimetal member in the optical axis direction toward the image formation device against the reference surface.

2. The projection lens unit according to claim 1, wherein the projection lens system further comprises a diaphragm, and wherein the lenses of the projection lens system include one or a plurality of lenses positioned on the side of the image formation device with respect to the diaphragm, having positive power, and having an Abbe number exceeding 70.

3. The projection lens unit according to claim 1, wherein a focal length of the one or plurality of lenses held by the movable lens barrel is set so as to have the following relation to an equivalent in air of a back focal length:

$$1 < f/LB\text{air} < 5$$

f: focal length

LBair: the equivalent in air of the back focal length.

4. The projection lens unit according to claim 1, wherein the number of lenses held by the movable lens barrel is two or less.

5. The projection lens unit according to claim 1, wherein the projection lens system is a zooming lens system, and the movable lens barrel is held fixed during zooming.

6. The projection lens unit according to claim 1, wherein the projection lens system is a telecentric optical system having an air equivalent back focal length equal to two or more times a diagonal length of the image formation device.

7. The projection lens unit according to claim 1, wherein an inner peripheral surface or outer peripheral surface of the movable lens barrel is slidably in contact with the holding tube, and a length in the optical axis direction of the contact portion between the movable lens barrel and the holding tube is 15 mm or greater.

8. The projection lens unit according to claim 1, wherein the bimetal member is flat or is ring-shaped with a depression on a low-expansion side.

9. The projection lens unit according to claim 1, wherein the movable lens barrel has a flange portion, and
   the bimetal member is positioned between the reference surface and the flange portion.

10. A projection lens unit comprising a projection lens system which enlarges and projects light from an image formation device onto a screen and a lens barrel which holds lenses of the projection lens system, wherein the lens barrel comprises:
    a movable lens barrel which holds one or a plurality of lenses, among the lenses of the projection lens system, having positive power and positioned closet to a side of the imager formation device;
    a holding tube which holds the movable lens barrel so as to be movable in an optical axis direction;
    a reference surface perpendicular to the optical axis;
    a thermal deformation member including a bimetal member which is deformed so as to decrease thickness thereof at the time of a temperature increase and which is disposed between the reference surface and the movable lens barrel; and
    an elastic member which presses the movable lens barrel and the bimetal member in the optical axis direction toward the screen against the reference surface.

11. The projection lens unit according to claim 10, wherein the movable lens barrel has a flange portion, and
    the bimetal member is positioned between the reference surface and the flange portion.

12. A projection lens unit comprising: a projection lens system which enlarges and projects image light from an image formation device onto a screen; and a lens barrel which holds lenses of the projection lens system, wherein the lens barrel comprises:

a movable lens barrel which holds one or a plurality of lenses, among the lenses of the projection lens system, having positive power and positioned closest to a side of the image formation device;

a holding tube which holds the movable lens barrel, so as to be movable in an optical axis direction; and a thermal deformation member which, through thermal deformation at the time of a temperature increase, moves the movable lens barrel in the optical axis direction so as to recede from the image formation device; and a rotation-halting mechanism which impedes rotation of the movable lens barrel about the optical axis relative to the holding tube, and which enables setting of the rotational position of the movable lens barrel about the optical axis relative to the holding tube to a plurality of positions.

13. The projection lens unit according to claim 10, wherein the projection lens system comprises a diaphragm, and wherein the lenses of the projection lens system include one or a plurality of lenses positioned on a side of the image formation device with respect to the diaphragm, positive power and having an Abbe numbers higher than 70.

14. The projection lens unit according to claim 10, wherein the bimetal member is ring-shaped with a depression on a high-expansion side.

15. The projection lens unit according to claim 10, wherein a focal length of the one or plurality of lenses held by the movable lens barrel is set so as to have the following relation to an equivalent in air of a back focal length:

$$1 < f/LBair < 5$$

f: focal length

LBair: the equivalent in air of the back focal length.

16. The projection lens unit according to claim 10, wherein the number of lenses held by the movable lens barrel is two or less.

17. The projection lens unit according to claim 10, wherein the projection lens system is a zooming lens system, and the movable lens barrel is held fixed during zooming.

18. The projection lens unit according to claim 10, wherein the projection lens system is a telecentric optical system having an air equivalent back focal length equal to two or more times a diagonal length of the image formation device.

19. The projection lens unit according to claim 10, wherein an inner peripheral surface or outer peripheral surface of the movable lens barrel is slidably in contact with the holding tube, and a length in the optical axis direction of the contact portion between the movable lens barrel and the holding tube is 15 mm or greater.

20. The projection lens unit according to claim 1 wherein the thermal deformation member further includes a ring-shaped base, and wherein the bimetal member includes a plurality of bimetal members fastened to the ring-shaped base.

21. The projection lens unit according to claim 10, wherein the thermal deformation member further includes a ring-shaped base, and wherein the bimetal member includes a plurality of bimetal members fastened to the ring-shaped base.

22. The projection lens unit according to claim 1, wherein the reference surface is formed integrally with the holding tube.

23. The projection lens unit according to claim 10, wherein the reference surface is formed integrally with the holding tube.

24. The projection lens unit according to claim 23, wherein the holding tube holds the lenses positioned on the screen side with respect to the one or plurality of lenses held by the movable lens tube, and wherein an inner peripheral surface of the movable lens barrel is slidably in contact with the holding tube.

* * * * *

UNITED STATES PATENT AND TRADEMARK OFFICE
CERTIFICATE OF CORRECTION

PATENT NO.       : 7,612,951 B2  
APPLICATION NO.  : 11/728120  
DATED            : November 3, 2009  
INVENTOR(S)      : Atsuo Masui, Tokuji Matsuda and Kohei Wataru Page 1 of 1

It is certified that error appears in the above-identified patent and that said Letters Patent is hereby corrected as shown below:

Column 27:
Line 24 claim 13, delete "positive" and insert -- having positive --.

Signed and Sealed this
Twenty-second Day of February, 2011

David J. Kappos
*Director of the United States Patent and Trademark Office*